US012626365B2

(12) United States Patent
Alemi et al.

(10) Patent No.: US 12,626,365 B2
(45) Date of Patent: May 12, 2026

(54) SYSTEMS AND METHODS TO PROCESS ELECTRONIC IMAGES TO SELECTIVELY HIDE STRUCTURES AND ARTIFACTS FOR DIGITAL PATHOLOGY IMAGE REVIEW

(71) Applicant: PAIGE.AI, Inc., New York, NY (US)

(72) Inventors: Navid Alemi, Conventry (GB); Christopher Kanan, Pittsford, NY (US)

(73) Assignee: Paige.AI, Inc., New York, NY (US)

( * ) Notice: Subject to any disclaimer, the term of this patent is extended or adjusted under 35 U.S.C. 154(b) by 621 days.

(21) Appl. No.: 17/934,908

(22) Filed: Sep. 23, 2022

(65) Prior Publication Data

US 2023/0098732 A1 Mar. 30, 2023

Related U.S. Application Data

(60) Provisional application No. 63/261,706, filed on Sep. 27, 2021.

(51) Int. Cl.
| | |
|---|---|
| *G06T 7/11* | (2017.01) |
| *G06T 5/77* | (2024.01) |
| *G06T 7/00* | (2017.01) |

(52) U.S. Cl.
CPC .................. *G06T 7/11* (2017.01); *G06T 5/77* (2024.01); *G06T 7/0014* (2013.01);
(Continued)

(58) Field of Classification Search
None
See application file for complete search history.

(56) References Cited

U.S. PATENT DOCUMENTS

| | | |
|---|---|---|
| 2019/0266726 A1 | 8/2019 | Madabhushi et al. |
| 2022/0005190 A1* | 1/2022 | N G ...................... G06T 7/0012 |
| 2022/0138956 A1* | 5/2022 | Palma ....................... G06T 5/77 |
| | | 382/131 |

FOREIGN PATENT DOCUMENTS

| | | |
|---|---|---|
| WO | 2020201772 A1 | 10/2020 |

OTHER PUBLICATIONS

Hung, A. L. Y., Sun, Z., Chen, W., & Galeotti, J. "Hierarchical Probabilistic Ultrasound Image Inpainting via Variational Inference". In Deep Generative Models, and Data Augmentation, Labelling, and Imperfections: First Workshop, DGM4MICCAI 2021, and First Workshop, DALI 2021, Held in Conjunction with MICCAI 2021, Strasbourg, France, Sep. 25, 2021, Proceedings 1 (pp. 83-92). Springer International Publishing.

(Continued)

*Primary Examiner* — Lennin R Rodriguezgonzalez
(74) *Attorney, Agent, or Firm* — Bookoff McAndrews, PLLC

(57) ABSTRACT

A computer-implemented method for processing digital pathology images, the method including receiving a plurality of digital pathology images of at least one pathology specimen, the pathology specimen being associated with a patient. The method may further include determining, using a machine learning system, whether artifacts or objects of interest are present on the digital pathology images. Once the machine learning system has determined that an artifact or object of interest is present, the system may determine one or more regions on the digital pathology images that contain artifacts or objects of interest. Once the system determines the regions on the digital pathology images that contain artifacts or objects of interest, the system may use a machine learning system to inpaint or suppress the region (Continued)

200 and output the digital pathology images with the artifacts or objects of interest inpainted or suppressed.

17 Claims, 15 Drawing Sheets

(52) U.S. Cl.
CPC .............. *G06T 2207/20081* (2013.01); *G06T 2207/20084* (2013.01); *G06T 2207/30024* (2013.01)

(56) References Cited

OTHER PUBLICATIONS

Jam, Jireh, et al. "A comprehensive review of past and present image inpainting methods." Computer vision and image understanding 203 (Nov. 18, 2020): 103147.

Zhang, H., Zhang, J., Perazzi, F., Lin, Z., & Patel, V. M. (2020). Deep Image Compositing. John Hopkins University, Whiting School of Engineering. Retrieved from https://engineering.jhu.edu/vpatel36/wp-content/uploads/2020/12/0756.

* cited by examiner

200

202  DATA INGESTION

204  DETECTION OF ARTIFACTS AND/OR AREAS OF INTEREST

206  IMAGE PAINTING OR SUPPRESSION

208  OUTPUT

302 CREATE A DATASET OF ARTIFACTS ON DIGITAL PATHOLOGY IMAGES

304 EXTRACT PATCHES FROM SEGMENTED AREAS AND THE AREAS WITHOUT ARTIFACTS

306 APPLY A LEARNING APPROACH TO THE SEGMENTED DATA

300

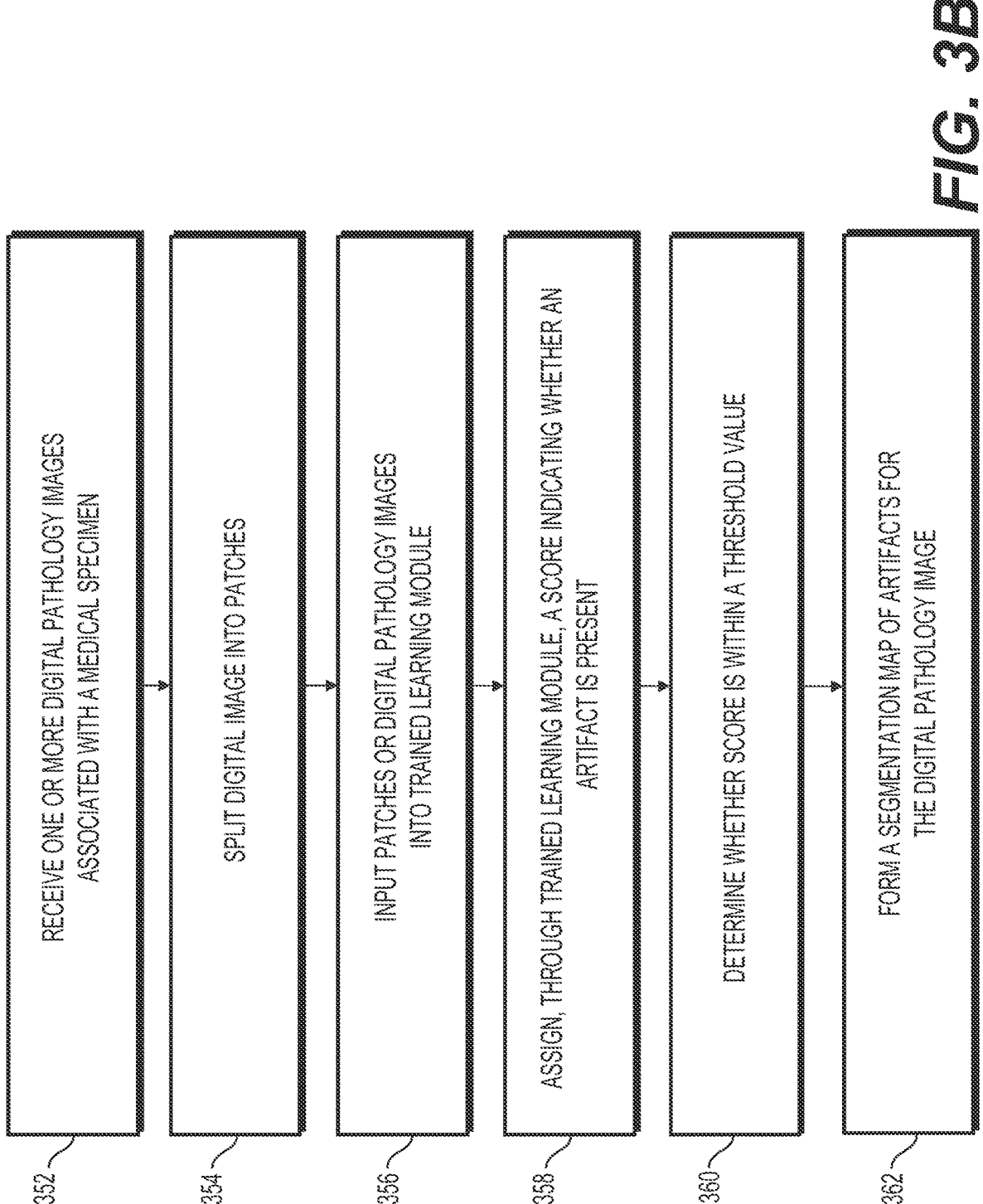

350

352 — RECEIVE ONE OR MORE DIGITAL PATHOLOGY IMAGES ASSOCIATED WITH A MEDICAL SPECIMEN

354 — SPLIT DIGITAL IMAGE INTO PATCHES

356 — INPUT PATCHES OR DIGITAL PATHOLOGY IMAGES INTO TRAINED LEARNING MODULE

358 — ASSIGN, THROUGH TRAINED LEARNING MODULE, A SCORE INDICATING WHETHER AN ARTIFACT IS PRESENT

360 — DETERMINE WHETHER SCORE IS WITHIN A THRESHOLD VALUE

362 — FORM A SEGMENTATION MAP OF ARTIFACTS FOR THE DIGITAL PATHOLOGY IMAGE

FIG. 3B

CREATE A DATASET OF ARTIFACTS ON DIGITAL PATHOLOGY IMAGES

402

EXTRACT TILES FROM DIGITAL PATHOLOGY IMAGES

404

TRAIN A SEGMENTATION CONVOLUTIONAL NEURAL NETWORK ON EXTRACTED TILES

406

SAVE THE LEARNED SEGMENTATION SYSTEM

408

400

450

452 — RECEIVE ONE OR MORE DIGITAL PATHOLOGY IMAGES ASSOCIATED WITH A MEDICAL SPECIMEN

454 — DIVIDE DIGITAL IMAGE INTO PATCHES

456 — INPUT PATCHES INTO SEGMENTATION MODULE

458 — SEGMENT, THROUGH USE OF THE SEGMENTATION MODULE, THE ARTIFACT REGION OF EACH TILE

460 — CONSTRUCT SEGMENTATION MAP FOR DIGITAL PATHOLOGY IMAGE

502 — CREATE A SEGMENTATION DATASET

504 — EXTRACT PATCHES FROM DIGITAL PATHOLOGY IMAGES WITH THEIR CORRESPONDING SEGMENTATION IMAGE

506 — TRAIN A DEEP NEURAL NETWORK FOR SEGMENTATION ON THE IMAGE PATCHES AND LABELS

500

552 — RECEIVE DIGITAL PATHOLOGY IMAGES AND SPLIT IMAGES INTO SMALL PATCHES

554 — SEGMENT THE PATCHES USING THE TRAINED DEEP NEURAL NETWORK

556 — MERGE THE ONE OR MORE SEGMENTED REGIONS TO CREATE A SEGMENTATION MAP

550

EXTRACT IMAGES PATCHES FROM INPUTTED DIGITAL PATHOLOGY IMAGES

602

INSERT IMAGE PATCHES INTO SYSTEM FOR ARTIFACT DETECTION

604

IF PATCH IS DETECTED AS INCLUDING AN ARTIFACT, REMOVE SLIDE FROM TRAINING SLIDES

606

OUTPUT ONE OR MORE DIGITAL PATHOLOGY IMAGES THAT ARE ARTIFACT FREE

608

600

702   RECEIVE ONE OR MORE DIGITAL PATHOLOGY IMAGES ASSOCIATED WITH A MEDICAL SPECIMEN

704   APPLY ARTIFACT DETECTOR

706   SELECT AN ARTIFACT TO BE REMOVED

708   INPAINT OR RECONSTRUCTURE REGIONS WITH ARTIFACTS

710   OUTPUT UPDATED DIGITAL PATHOLOGY IMAGES

700

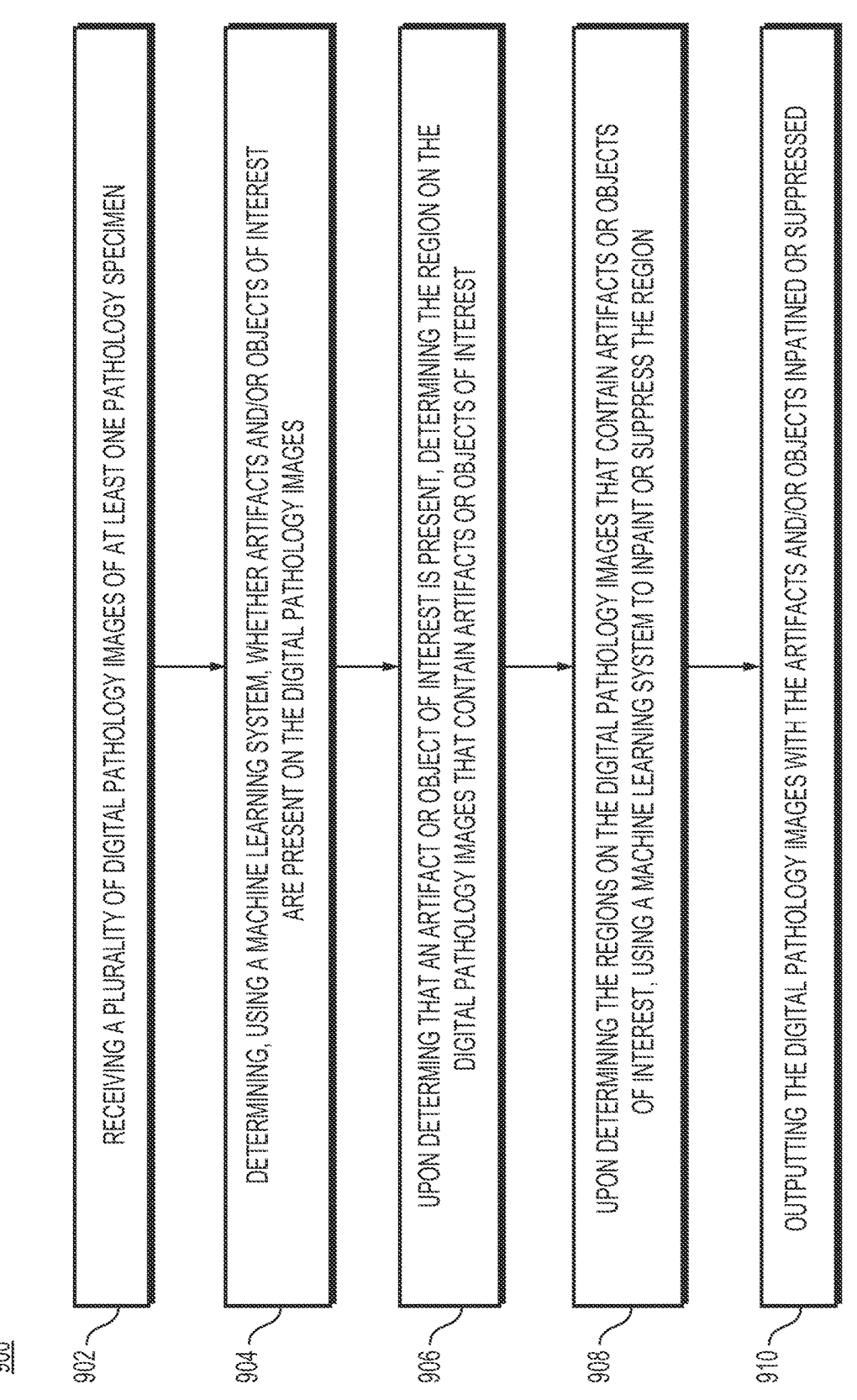

900

902 — RECEIVING A PLURALITY OF DIGITAL PATHOLOGY IMAGES OF AT LEAST ONE PATHOLOGY SPECIMEN

904 — DETERMINING, USING A MACHINE LEARNING SYSTEM, WHETHER ARTIFACTS AND/OR OBJECTS OF INTEREST ARE PRESENT ON THE DIGITAL PATHOLOGY IMAGES

906 — UPON DETERMINING THAT AN ARTIFACT OR OBJECT OF INTEREST IS PRESENT, DETERMINING THE REGION ON THE DIGITAL PATHOLOGY IMAGES THAT CONTAIN ARTIFACTS OR OBJECTS OF INTEREST

908 — UPON DETERMINING THE REGIONS ON THE DIGITAL PATHOLOGY IMAGES THAT CONTAIN ARTIFACTS OR OBJECTS OF INTEREST, USING A MACHINE LEARNING SYSTEM TO INPAINT OR SUPPRESS THE REGION

910 — OUTPUTTING THE DIGITAL PATHOLOGY IMAGES WITH THE ARTIFACTS AND/OR OBJECTS INPATINED OR SUPPRESSED

FIG. 9

SYSTEMS AND METHODS TO PROCESS ELECTRONIC IMAGES TO SELECTIVELY HIDE STRUCTURES AND ARTIFACTS FOR DIGITAL PATHOLOGY IMAGE REVIEW

RELATED APPLICATION(S)

This application claims priority to U.S. Provisional Application No. 63/261,706 filed Sep. 27, 2021, the entire disclosure of which is hereby incorporated herein by reference in its entirety.

FIELD OF THE DISCLOSURE

Various embodiments of the present disclosure pertain generally to image processing methods. More specifically, particular embodiments of the present disclosure relate to systems and methods to selectively hide artifacts during digital review.

BACKGROUND

In human and animal pathology, visual examination of tissue under a microscope may be vital to diagnostic medicine, e.g., to diagnose cancer or in drug development (such as in assessing toxicity). With current pathology techniques, tissue samples may undergo multiple preparation steps so that different tissue structures may be differentiated visually by the human eye. These steps may consist of: (i) preserving the tissue using fixation; (ii) embedding the tissue in a paraffin block; (iii) cutting the paraffin block into thin sections (e.g., 3-5 micrometers or μm); (iv) mounting the sections on glass slides; and (v) staining mounted tissue sections to highlight important components or structures. With the use of stains and dyes, histology allows pathologists to visualize tissue structures and/or tissues, chemical elements within cells, and even microorganisms. However, some structures (e.g., hair, ink, bubbles, etc.) on a slide and/or appearing in an image of the slide may interfere with a visualization experience.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the present disclosure, systems and methods are disclosed for processing electronic medical images, comprising: receiving a plurality of digital pathology images of at least one pathology specimen, the pathology specimen being associated with a patient; determining, using a machine learning system, whether artifacts or objects of interest are present on the digital pathology images; upon determining that an artifact or object of interest is present, determining one or more regions on the digital pathology images that contain artifacts or objects of interest; upon determining the regions on the digital pathology images that contain artifacts or objects of interest, using a machine learning system to inpaint or suppress the region; and outputting the digital pathology images with the artifacts or objects of interest inpainted or suppressed.

A system for processing electronic medical images, the system including: at least one memory storing instructions; and at least one processor configured to execute the instructions to perform operations including: receiving a plurality of digital pathology images of at least one pathology specimen, the pathology specimen being associated with a patient; determining, using a machine learning system, whether artifacts or objects of interest are present on the digital pathology images; upon determining that an artifact or object of interest is present, determining one or more regions on the digital pathology images that contain artifacts or objects of interest; upon determining the regions on the digital pathology images that contain artifacts or objects of interest, using a machine learning system to inpaint or suppress the region; and outputting the digital pathology images with the artifacts or objects of interest inpainted or suppressed.

A non-transitory computer-readable medium storing instructions that, when executed by a processor, perform operations processing electronic medical images, the operations including: receiving a plurality of digital pathology images of at least one pathology specimen, the pathology specimen being associated with a patient; determining, using a machine learning system, whether artifacts or objects of interest are present on the digital pathology images; upon determining that an artifact or object of interest is present, determining one or more regions on the digital pathology images that contain artifacts or objects of interest; upon determining the regions on the digital pathology images that contain artifacts or objects of interest, using a machine learning system to inpaint or suppress the region; and outputting the digital pathology images with the artifacts or objects of interest inpainted or suppressed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3B is a flowchart illustrating an example method for using an algorithm that uses classification based approaches to identify artifacts in a digital image, according to techniques presented herein.

FIG. 9 is a flowchart illustrating an example method for processing an image, according to one or more exemplary embodiments herein.

DESCRIPTION OF THE EMBODIMENTS

Figure 1A:
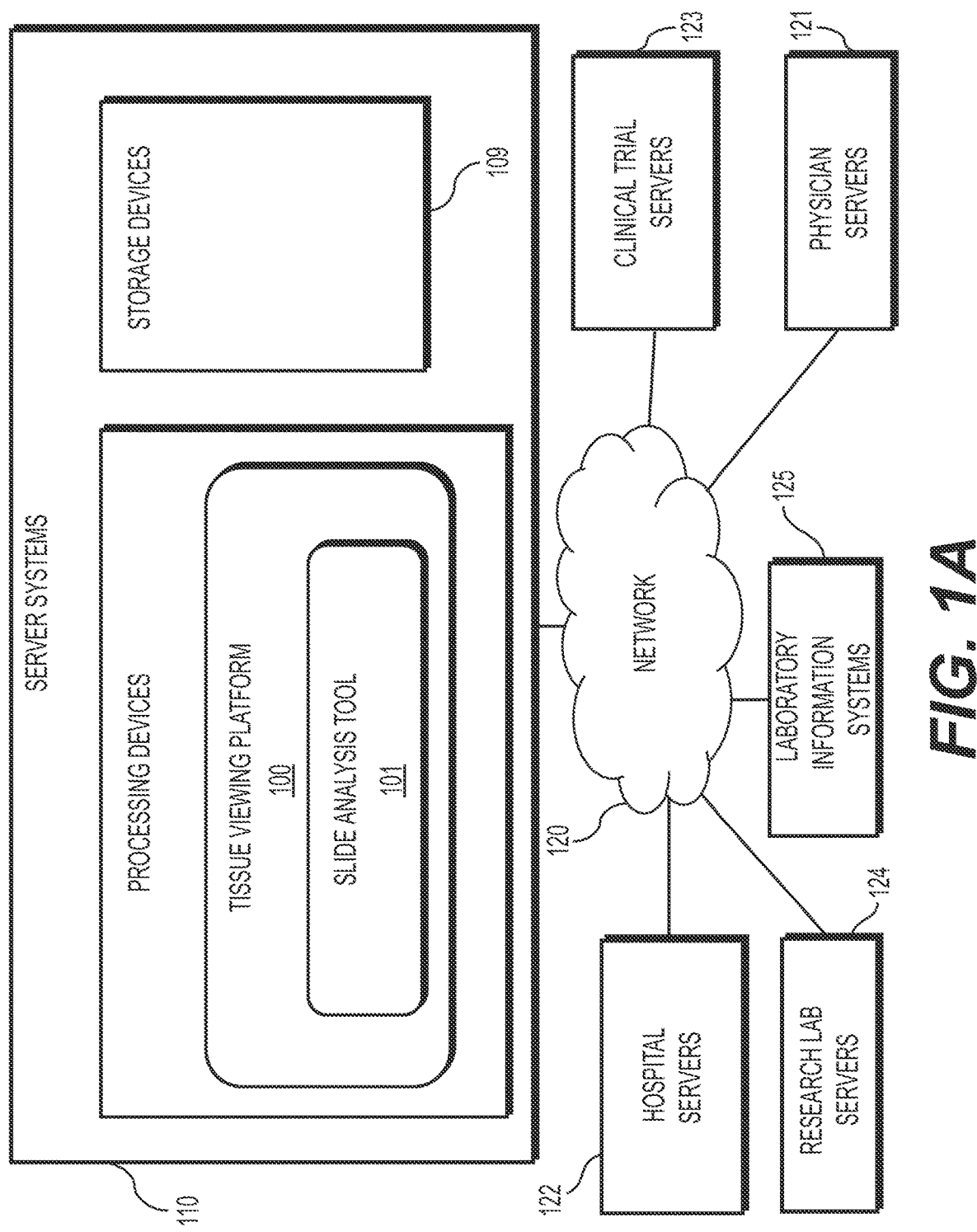
FIG. 1A illustrates an exemplary block diagram of a system and network for processing images, for example tissue viewing, according to techniques presented herein.

Reference will now be made in detail to the exemplary embodiments of the present disclosure, examples of which are illustrated in the accompanying drawings. Wherever possible, the same reference numbers will be used throughout the drawings to refer to the same or like parts.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

As used herein, the term "exemplary" is used in the sense of "example," rather than "ideal." Moreover, the terms "a" and "an" herein do not denote a limitation of quantity, but rather denote the presence of one or more of the referenced items.

Techniques presented herein describe determining the location of artifacts or objects of interest in digital images and inpainting or suppressing the irrelevant images of a region using computer vision and/or machine learning.

The term artifact may be refer to an artificial structure or tissue alteration on a prepared microscopic slide that was caused as a result of an extraneous factor or an outside source. An artifact may refer to an object that is not of diagnostic interest. An artifact may be caused during preparation of tissue or caused during scanning of a digital image. For example, an artifact may occur during surgical removal, fixation, tissue processing, embedding, and microtomy and staining and mounting procedures. There may be many types of artifacts such as prefixation artifacts, fixation artifacts, artifacts related to bone tissue, tissue-processing artifacts, artifacts related to microtomy, artifacts related to floatation and mounting, staining artifacts, and mounting artifacts. Examples of artifacts may include ink, hair, blur, scanlines, or bubbles.

Objects of interest may refer to an object and/or area of a medical digital slide that a pathologist may wish to select.

An object of interest may also refer to a particular type of artifact (e.g., bubbles), all artifacts, the tissue, or specific tissue structures of interest (e.g., cancer, nerves, etc.).

Inpainting may refer to the process of replacing corrupt, damaged, or unwanted pixels in a digital image with meaningful structures. Meaningful structures may refer to the structures that may have been present on a digital image if an artifact was not present and blocking view of the meaningful structure. Inpainting may result in the removal of artifacts from the digital images.

Suppression may refer to the process of selecting areas that are not regions of interest and then making these regions invisible or partially transparent, such as through alpha blending or alpha compositing in which an alpha value or alpha channel of these regions may be set to an alternative level. This may be include creation of a suppression mask as described in greater detail below. For example, suppression techniques may be utilized on specific detected artifacts in the one or more digital images mage or may be applied to the background of one or more digital images.

Techniques presented herein may relate to using medical images while using image processing techniques and/or machine learning to suppress or inpaint regions of the digital medical image that contain artifacts or objects of interest.

As used herein, a "machine learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Deep learning techniques may also be employed. Aspects of a machine learning model may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch, or batch-based, etc.

FIG. 1A illustrates a block diagram of a system and network for processing images to produce a low blur image, using machine learning, according to an exemplary embodiment of the present disclosure.

Specifically, FIG. 1A illustrates an electronic network 120 that may be connected to servers at hospitals, laboratories, and/or doctors' offices, etc. For example, physician servers 121, hospital servers 122, clinical trial servers 123, research lab servers 124, and/or laboratory information systems 125, etc., may each be connected to an electronic network 120, such as the Internet, through one or more computers, servers, and/or handheld mobile devices. According to an exemplary embodiment of the present disclosure, the electronic network 120 may also be connected to server systems 110, which may include processing devices that are configured to implement a tissue viewing platform 100, which may include a slide analysis tool 201 for determining specimen property or image property information pertaining to digital pathology image(s), and using machine learning to classify digital pathology image(s), according to an exemplary embodiment of the present disclosure.

The physician servers 121, hospital servers 122, clinical trial servers 123, research lab servers 124, and/or laboratory information systems 125 may create or otherwise obtain images of one or more patients' cytology specimen(s), histopathology specimen(s), slide(s) of the cytology specimen(s), digitized images of the slide(s) of the histopathology specimen(s), or any combination thereof. The physician servers 121, hospital servers 122, clinical trial servers 123, research lab servers 124, and/or laboratory information systems 125 may also obtain any combination of patient-specific information, such as age, medical history, cancer treatment history, family history, past biopsy or cytology information, etc. The physician servers 121, hospital servers 122, clinical trial servers 123, research lab servers 124, and/or laboratory information systems 125 may transmit digitized slide images and/or patient-specific information to server systems 110 over the electronic network 120. Server systems 110 may include one or more storage devices 109 for storing images and data received from at least one of the physician servers 121, hospital servers 122, clinical trial servers 123, research lab servers 124, and/or laboratory information systems 125. Server systems 110 may also include processing devices for processing images and data stored in the one or more storage devices 109. Server systems 110 may further include one or more machine learning tool(s) or capabilities. For example, the processing devices may include a machine learning tool for a tissue viewing platform 100, according to one embodiment. Alternatively or in addition, the present disclosure (or portions of the system and methods of the present disclosure) may be performed on a local processing device (e.g., a laptop).

The physician servers 121, hospital servers 122, clinical trial servers 123, research lab servers 124, and/or laboratory information systems 125 refer to systems used by pathologists for reviewing the images of the slides. In hospital settings, tissue type information may be stored in one of the laboratory information systems 125.

Figure 1B:
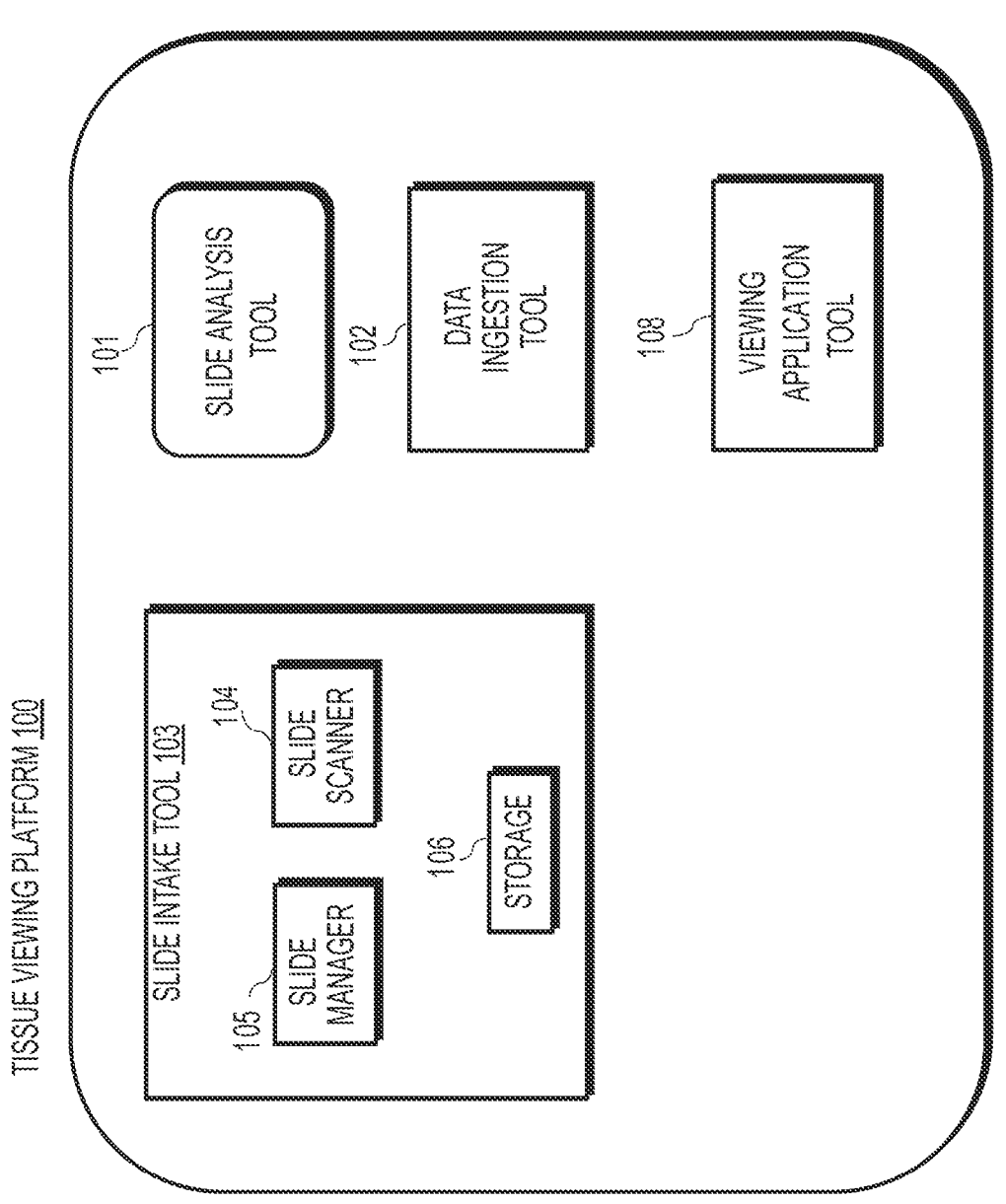
FIG. 1B illustrates an exemplary block diagram of a tissue viewing platform according to techniques presented herein.

FIG. 1B illustrates an exemplary block diagram of a tissue viewing platform 100 for determining specimen property of image property information pertaining to digital pathology image(s), using machine learning. For example, the tissue viewing platform 100 may include a slide analysis tool 101, a data ingestion tool 102, a slide intake tool 103, a slide scanner 104, a slide manager 105, a storage 106, and a viewing application tool 108.

The slide analysis tool 101, as described below, refers to a process and system for processing digital images associated with a tissue specimen, and using machine learning to analyze a slide, according to an exemplary embodiment.

The data ingestion tool 102 refers to a process and system for facilitating a transfer of the digital pathology images to the various tools, modules, components, and devices that are used for classifying and processing the digital pathology images, according to an exemplary embodiment.

The slide intake tool 103 refers to a process and system for scanning pathology images and converting them into a digital form, according to an exemplary embodiment. The slides may be scanned with slide scanner 104, and the slide manager 105 may process the images on the slides into digitized pathology images and store the digitized images in storage 106.

The viewing application tool 108 refers to a process and system for providing a user (e.g., a pathologist) with specimen property or image property information pertaining to digital pathology image(s), according to an exemplary embodiment. The information may be provided through various output interfaces (e.g., a screen, a monitor, a storage device, and/or a web browser, etc.).

The slide analysis tool 101, and each of its components, may transmit and/or receive digitized slide images and/or patient information to server systems 110, physician servers 121, hospital servers 122, clinical trial servers 123, research lab servers 124, and/or laboratory information systems 125 over an electronic network 120. Further, server systems 110 may include one or more storage devices 109 for storing images and data received from at least one of the slide analysis tool 101, the data ingestion tool 102, the slide intake tool 103, the slide scanner 104, the slide manager 105, and viewing application tool 108. Server systems 110 may also include processing devices for processing images and data stored in the storage devices. Server systems 110 may further include one or more machine learning tool(s) or capabilities, e.g., due to the processing devices. Alternatively or in addition, the present disclosure (or portions of the system and methods of the present disclosure) may be performed on a local processing device (e.g., a laptop).

Any of the above devices, tools and modules may be located on a device that may be connected to an electronic network 120, such as the Internet or a cloud service provider, through one or more computers, servers, and/or handheld mobile devices.

Figure 1C:
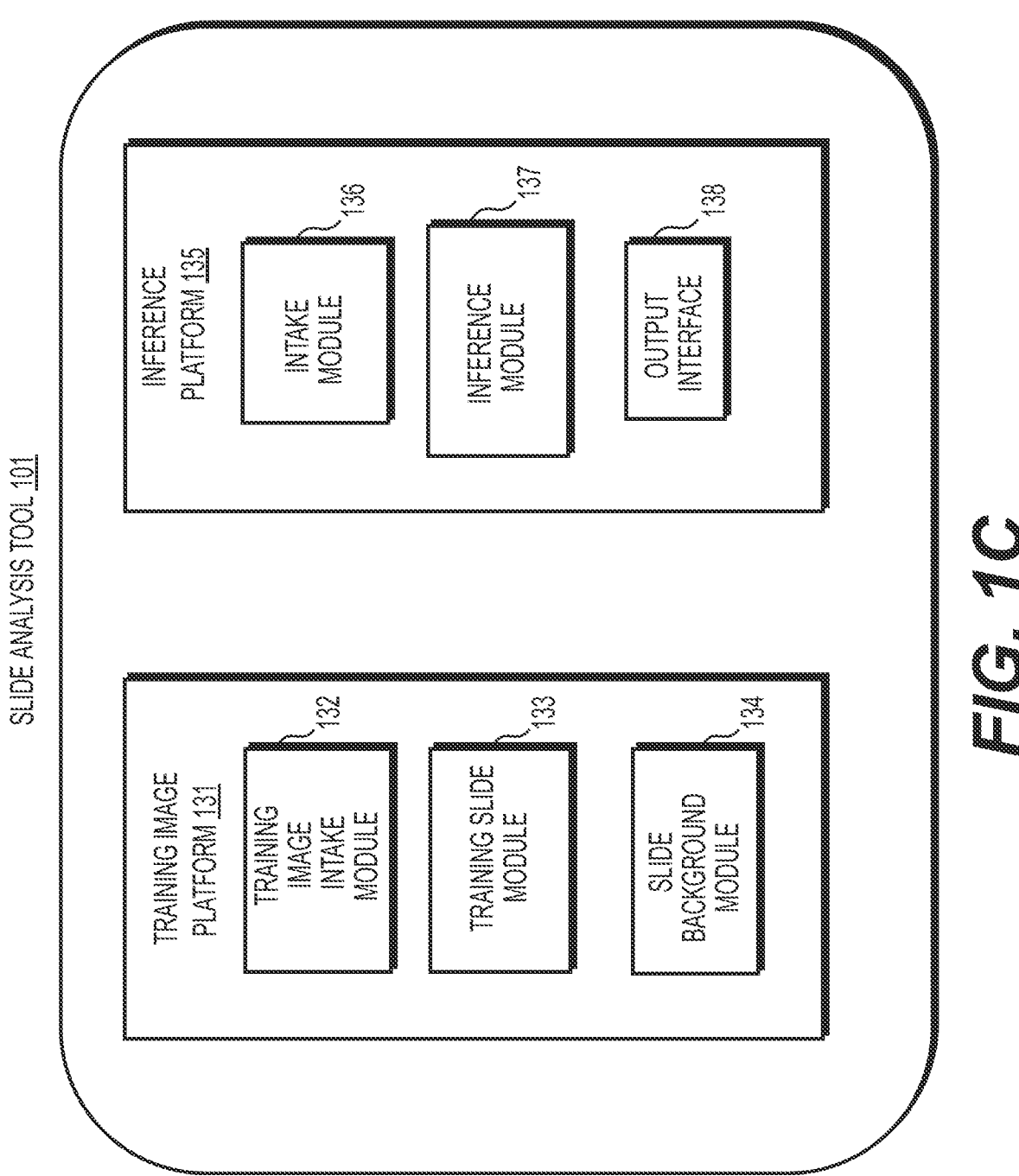
FIG. 1C illustrates an exemplary block diagram of a slide analysis tool, according to techniques presented herein.

FIG. 1C illustrates an exemplary block diagram of a slide analysis tool 101, according to an exemplary embodiment of the present disclosure. The slide analysis tool may include a training image platform 131 and/or an inference platform 135.

The training image platform 131, according to one embodiment, may create or receive training images that are used to train a machine learning system to effectively analyze and classify digital pathology images. For example, the training images may be received from any one or any combination of the server systems 110, physician servers 121, hospital servers 122, clinical trial servers 123, research lab servers 124, and/or laboratory information systems 125. Images used for training may come from real sources (e.g., humans, animals, etc.) or may come from synthetic sources (e.g., graphics rendering engines, 3D models, etc.). Examples of digital pathology images may include (a) digitized slides stained with a variety of stains, such as (but not limited to) H&E, Hematoxylin alone, IHC, molecular pathology, etc.; and/or (b) digitized image samples from a 3D imaging device, such as micro-CT.

The training image intake module 132 may create or receive a dataset comprising one or more training images corresponding to either or both of images of a human and/or animal tissue and images that are graphically rendered. For example, the training images may be received from any one or any combination of the server systems 110, physician servers 121, and/or laboratory information systems 125. This dataset may be kept on a digital storage device. The training slide module 133 may intake training data that includes images and corresponding information. For example, training slide module 133 training data may include receiving one or more images (e.g., whole slide images or WSIs) of a human or animal. Training slide module 133 may also receive training data related to the type and location of specific artifacts corresponding to the digital images used for training. The training slide module 133 may include the ability to break an inputted WSI into tiles to perform further analysis of individual tiles of a WSI. The training slide module 133 may utilize, for example, convolutional neural network ("CNN"), CoordConv, Capsule network, Random Forest Support Vector Machine, Transformer trained directly with the appropriate loss function in order to help provide training for the machine learning techniques described herein. The slide background module 134 may analyze images of tissues and determine a background within a digital pathology image. It may be useful to identify a background within a digital pathology slide to ensure tissue segments are not overlooked.

According to one embodiment, the inference platform 135 may include an intake module 136, an inference module 137, and an output interface 138. The inference platform 135 may receive a plurality of electronic images/additional information and apply one or more machine learning models to the received plurality of electronic images to identify one or more artifacts, defects, or gaps of structures of interest and to then suppress or inpaint the identified regions. For example, the plurality of electronic images or additional information may be received from any one or any combination of the server systems 110, physician servers 121, hospital servers 122, clinical trial servers 123, research lab servers 124, and/or laboratory information systems 125. The intake module 136 may receive digital images (e.g., whole slide images) corresponding to one or more patients/individuals. Further, the digital images may correspond to an animal. Further, the intake module may receive information identifying one or more particular artifacts to search for or identify, inputted by a user of the system. The inference module 137 may apply one or more machine learning models to one or more digital images in order to identify one or more artifacts and/or areas of interest. The inference module 137 may further apply one or more machine learning models to one or more digital images to perform suppression and/or inpainting on the one or more identified artifacts and/or areas of interest.

The output interface 138 may be used to updated inputted images (e.g., to a screen, monitor, storage device, web browser, etc.). The output interface 138 may be capable of outputting digital images that were previously provided with suppression and/or inpainting applied to the images. Artifacts located on the digital images may in particular be inpainted or suppressed on outputted digital images.

System and methods of the present disclosure may use machine learning and image processing tools to help pathologists adjust images according to their needs, uses, and/or preferences. Systems and methods of the present disclosure may take one or more whole slide images (WSI) or image regions as input and provide several tools for the pathologist to adjust an appearance of the images according to their needs, uses, and/or preferences. Aspects of the present disclosure may be used as part of a visualization software that pathologists use to view digital images in their routine workflow.

Tissue preparation may typically be done manually and hence introduce large variability to an image of a tissue that is scanned by a digital scanner. One tissue preparation step may be to create visible contrast to the image, which may be done by staining the tissue. During this process, chemical substances may be attached to different compounds in the tissue, delineating different cellular structures. Different stains may highlight different structures, and their interpretation and/or use may be different. Depending on a disease and its underlying behavior, one type of stain may be preferable or more desirable for a pathologist over the others.

Although there are standard protocols for using these stains, this process may have disadvantages. Protocols vary per institution, and often, overstaining or understaining of tissue may occur, which may obscure some information. Moreover, multiple stains may be used together to highlight several structures of interest in the tissue, e.g., tissue that is stained with both hematoxylin and eosin (H&E).

When pathologists view slides with a traditional microscope, they might not be able to alter characteristics of the image, e.g., by increasing a brightness, adjusting a contrast, adjusting an amount of a particular stain, etc. However, image processing and Artificial Intelligence (AI)-enabled tools may facilitate making these adjustments in the context of digital WSI. These tools may enable pathologists to better analyze tissue samples from human or animal patients by allowing pathologists to adjust image properties in semantically meaningful ways, such as removal of artifacts (e.g., hair, ink, bubbles, etc.).

Color variations in slides may pose hurdles for a pathologist who is investigating a tissue sample under a microscope. For example, one image of a tissue sample may look pinker in contrast to other images that a pathologist reviewed during the same day. Such out-of-distribution images might be hard for pathologists to investigate, as separating different structures may be confusing. For instance, a main characteristic of lymphocytes in H&E images is a dark purple color; however, in some poorly stained images, the lymphocytes might have a similar color as other cells. Applying a medical image analysis tool for color adjustments might overcome this challenge. Overall, visualizing finer details, sharpening a field of view, changing an image color, and visualizing objects may not be feasible in current routine pathologist workflows.

Aspects of the present disclosure may use Artificial Intelligence (AI) and image processing techniques to selectively detect artifacts and objects of interest (e.g., specific glands) from WSIs and, if needed and/or desired, to reconstruct the detected regions. Aspects of the present disclosure may provide a process having two steps: 1) detection of artifacts or morphological structures of interest, and 2) image inpainting or suppression of non-relevant image regions.

Figure 2:
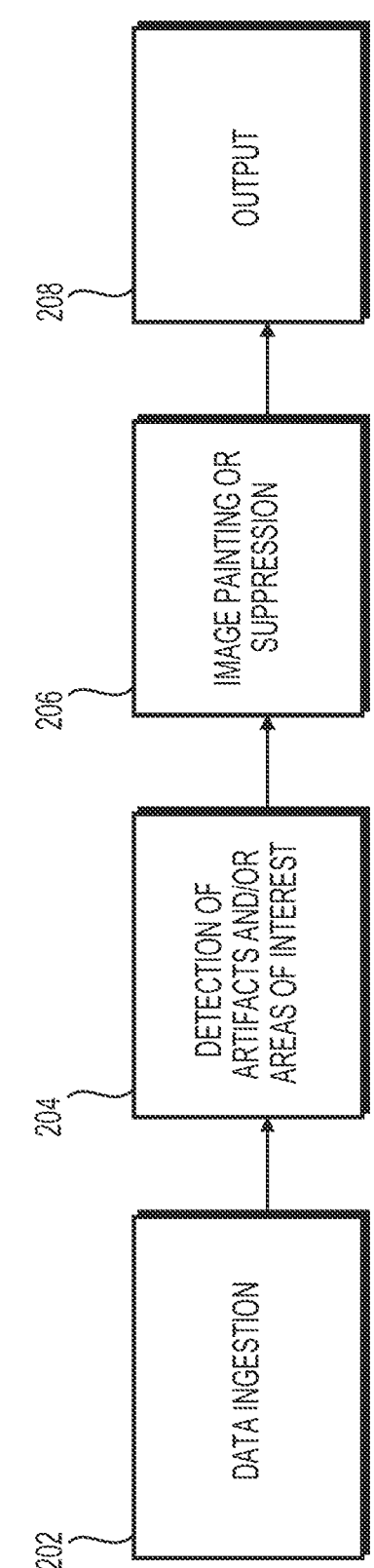
FIG. 2 illustrates a process for hiding of structures and artifacts of digital images, according to techniques presented herein.

FIG. 2 illustrates a process for hiding of structures and/or artifacts of digital images, according to techniques presented herein. The system may first include data ingestion 202. Data ingestion 202 may include receiving one or more digital medical images (e.g., WSI of an autopsy pathology specimen, magnetic resonance imaging (MRI), computed tomography (CT), positron emission tomography (PET), mammogram, etc.) into a digital storage device (e.g., hard drive, network drive, cloud storage, RAM, etc.).

At step 204, the system may detect one or more artifacts or objects of interest from the received data, such as digital pathology images, of step 202. As discussed in greater detail below, step 204 may be performed using either artifact-agnostic approaches or artifact-specific approaches. These approaches may utilize machine learning techniques. The artifact-agnostic approach may include utilizing segmentation or classification techniques. The artifact-specific approaches may utilize, for example, (1) the appearance or shape of the artifacts, (2) the objects of interest, or (3) arbitrary structures, for the detection of artifacts and/or objects of interest. The detection may include creating a segmentation map delineating regions of each digital pathology image including the detected artifacts.

At step 206, the system may apply inpainting and/or suppression to artifacts, objects of interest, and/or irrelevant regions of one or more of images of the inserted images of step 202. These may be the regions identified as containing artifacts and/or objects of interest at step 204. Various inpainting algorithms may be utilized to fill in area that contain artifacts with meaningful structure. These regions may be selected manually by a user or may be automatically determined based on step 204. The selected regions may be inputted into an inpainting algorithm. One or more of the inpainting algorithms may include, but are not limited to, Local Patch Statistics and Steering Kernel Feature; Intra-channel and Inter-channel local variances; Fractional-order derivative and Fourier transform Fractional-order derivative and Fourier transform; Encoder-decoder architectures like Unet; or Generative Adversarial Networks ("GANs"). Alternatively, regions of interest may have the pixel's alpha values adjusted to make artifact regions invisible or partially transparent as will be discussed in greater detail below.

At step 208, the system may output one or more images with inpainting or suppression applied. This may include outputting a segmentation map. Further, the system may be capable of outputting one or more tools that allow for a user to perform any of the steps of FIG. 2. For instance, a user may be able to insert images into the system. The system may then allow for the user to determine a method of searching for artifacts or areas of interest. The user may further select certain artifacts to be removed from images. Alternatively, a user may be able to select an area of interest for further analysis and have the rest of the image suppressed. The user may be able to select what algorithm/techniques will be utilized to perform these tasks as well.

Figure 3A:
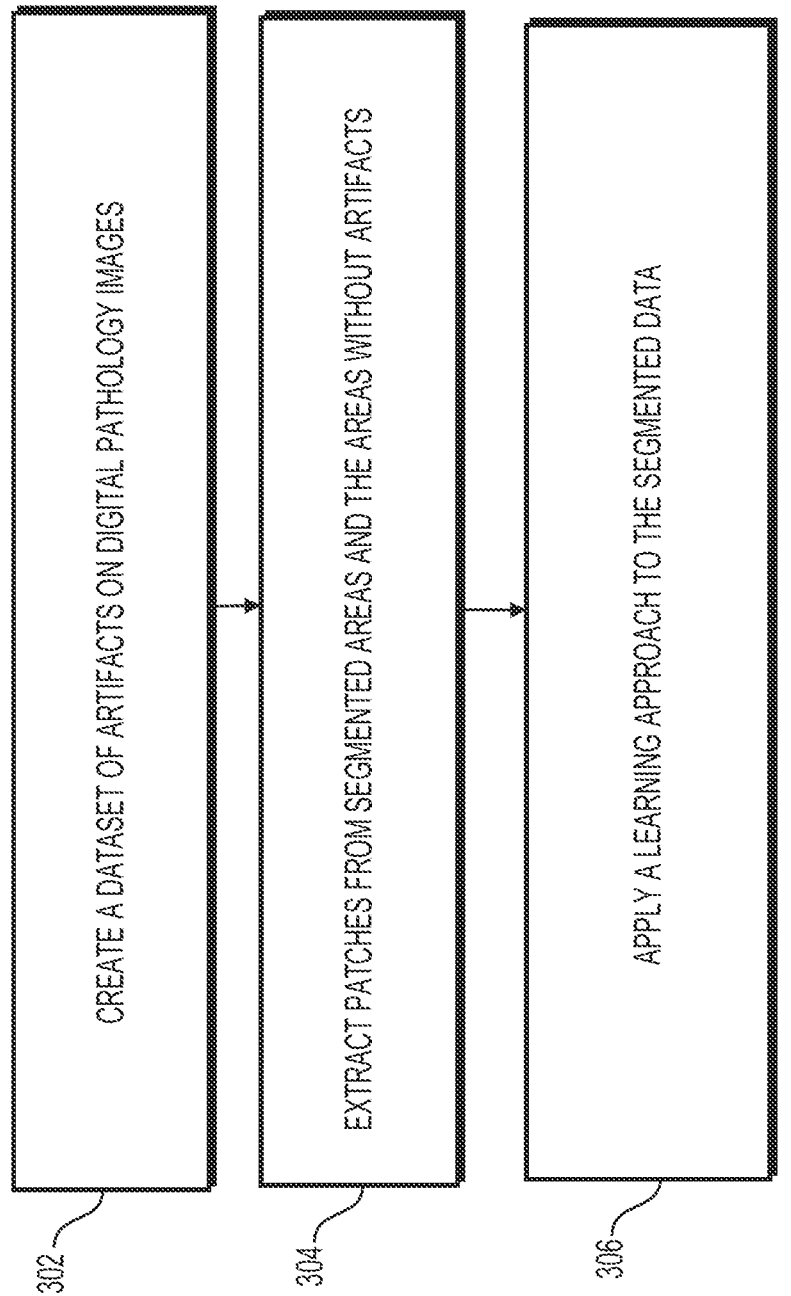
FIG. 3A is a flowchart illustrating an example method for training an algorithm that uses a classification based approaches to identify artifacts in a digital image, according to techniques presented herein.
Figure 4A:
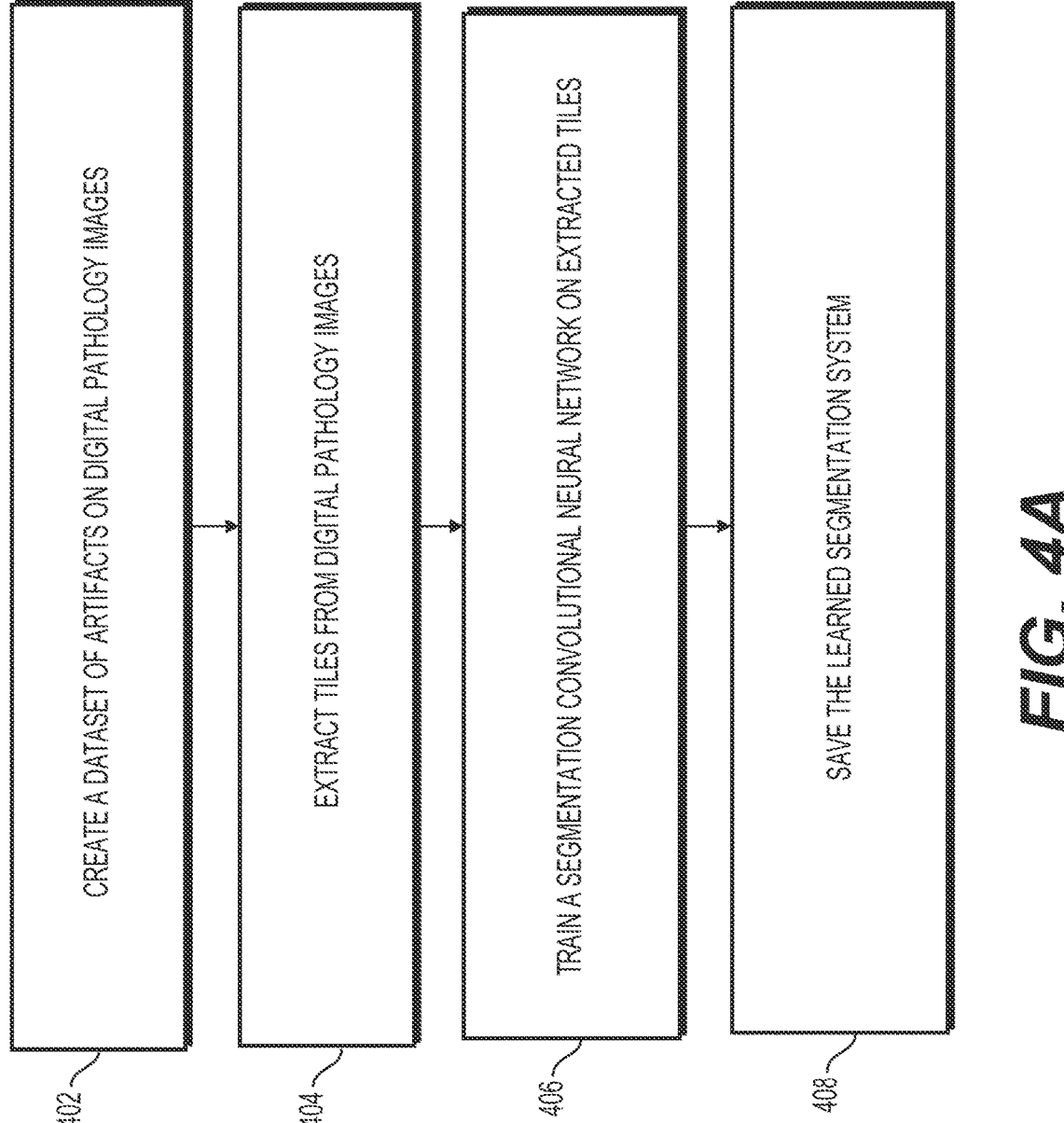
FIG. 4A is a flowchart illustrating an example method for training an algorithm that uses a segmentation based approach to identify artifacts in a digital image, according to techniques presented herein.
Figure 4B:
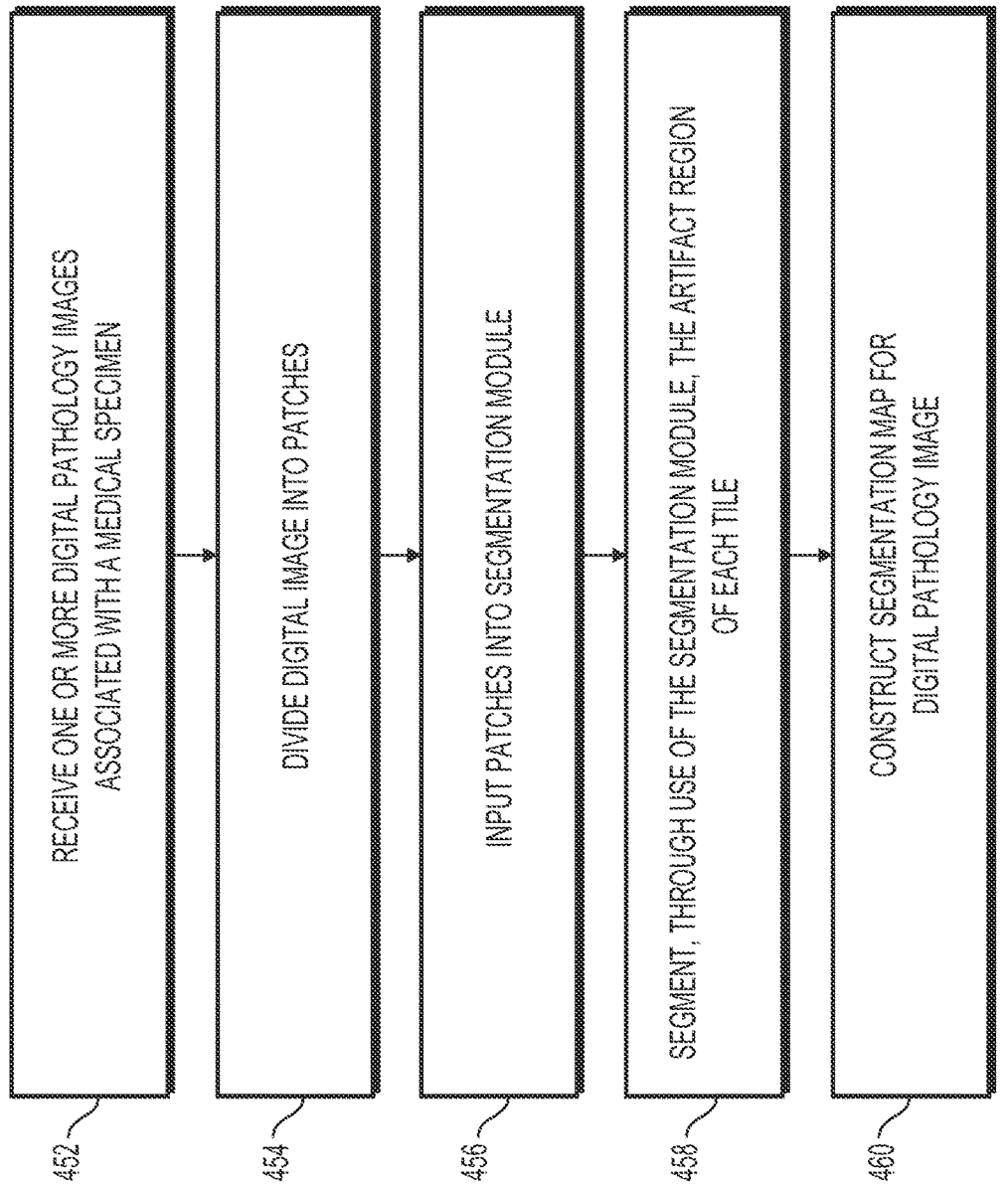
FIG. 4B is a flowchart illustrating an example method for using an algorithm that uses a segmentation based approach to identify artifacts in a digital image, according to techniques presented herein
Figure 5A:
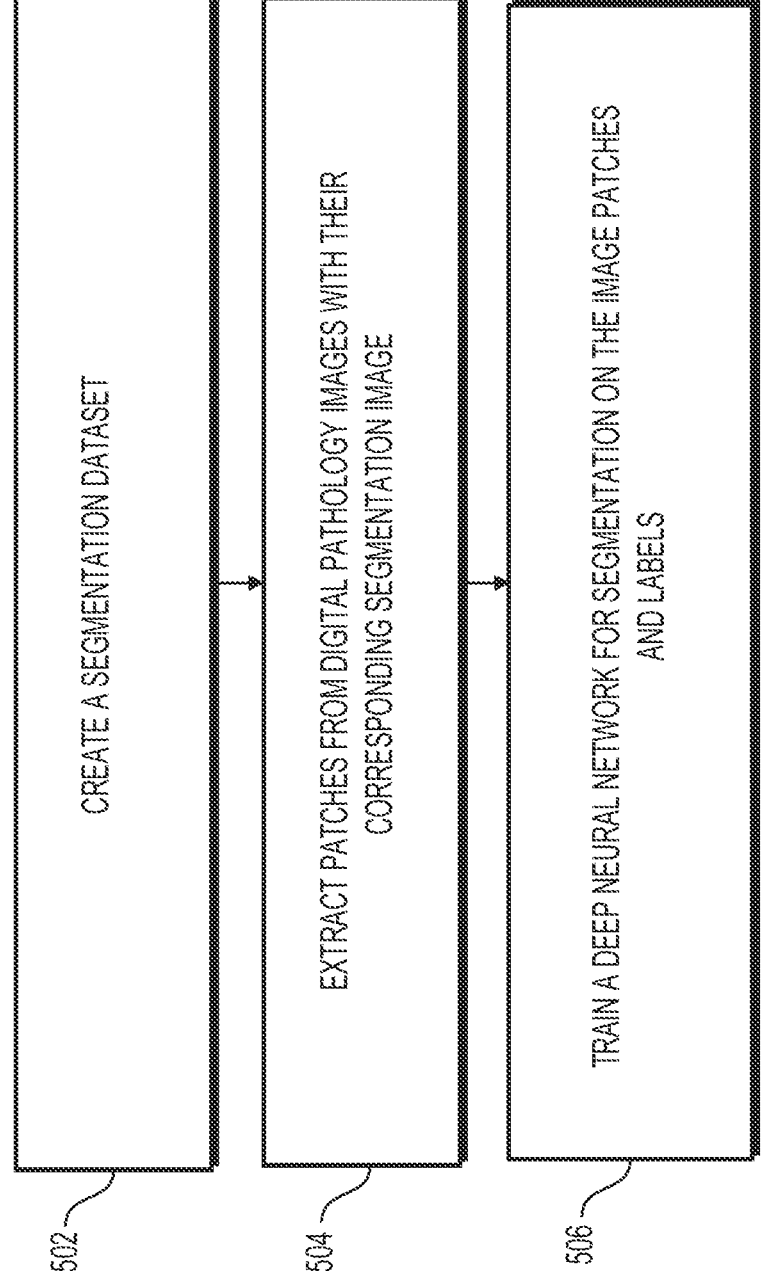
FIG. 5A is a flowchart illustrating an example method for training an system to identify structures of interest in a digital image, according to techniques presented herein.
Figure 5B:
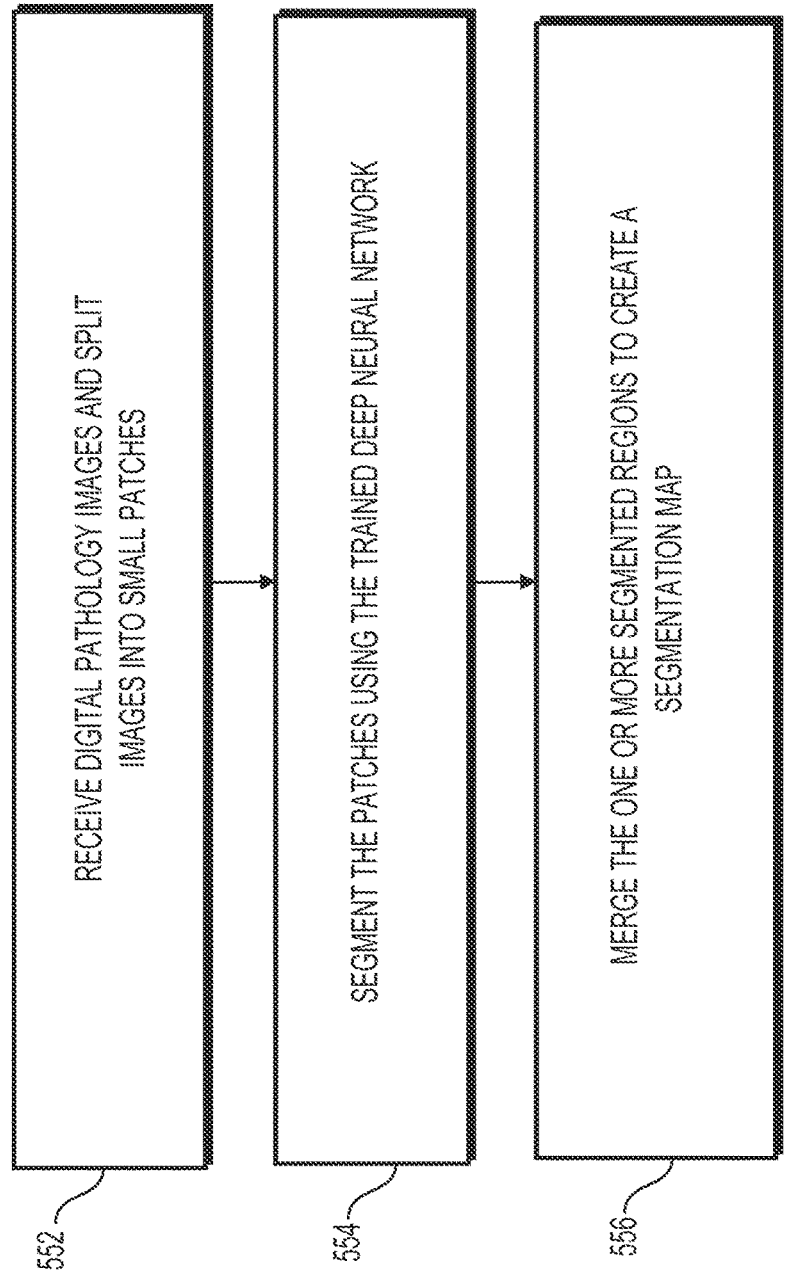
FIG. 5B is a flowchart illustrating an example method for using a system to identify structures of interest in a digital image, according to techniques presented herein.

As previously mentioned, at step 204, the system may utilize artifact-agnostic approaches to identify artifacts in a digital pathology image, such as, for example, a WSI. The system may utilize two general approaches: artifact-agnostic and artifact-specific. With respect to the artifact-agnostic approach, the system may use either classification or segmentation based approaches. FIGS. 3A and 3B describe a method of training and using a classification based approaches to identify artifacts in a digital pathology image, such as, for example, a WSI. FIGS. 4A and 4B describe a method of training and using a segmentation-based approach to identify artifacts in a digital pathology image, such as, for example, a WSI. With respect to the artifact-specific approaches, the system may use either approach based on appearance, shape, or arbitrary structure as described in greater detail below. Further, the system may be capable of determining structures of interest. FIGS. 5A and 5B describe a method training and using a system to identify structures of interest in a digital pathology image, such as, for example, a WSI.

An artifact-agnostic approach may include learning approaches that may be used to detect almost all artifacts. A segmentation or classification pipeline approach may be used. An artifact-agnostic approach might involve searching for artifacts in a way that does not distinguish among kinds or types of artifacts, (e.g., ink versus hair, bubbles, etc.), but may instead treat or classify all artifacts as a universal "artifact" category.

FIG. 3A is a flowchart illustrating an example method for training an algorithm that uses a classification based approaches to identify artifacts in a digital pathology image, such as, for example, a WSI, according to techniques presented herein. The processes and techniques described in FIG. 3A may be used to train a machine learning model to identify artifacts or areas of interest of digital pathology images. The method 300 of FIG. 3A depicts steps that may be performed by, for example, training image platform 131 of slide analysis tool 101 as described above in FIG. 1C. Alternatively, the method may be performed by an external system. Flowchart/method 300 depicts training steps to train a machine learning model as described in further detail in steps 302-306.

Classification-based artifact detection may be used to delineate regions of a digital pathology image containing an artifact by training a classification-based artifact detection system and by making inferences with the classification-based artifact detection system.

At step 302, the system may create a dataset of artifacts on digital pathology images, such as, for example, WSIs. The system may first receive one or more digital pathology images that do not include artifacts. Next, the system may utilize techniques described herein to add artifacts to the digital pathology images to utilize as training images. This dataset may include digital pathology images with each artifact annotated, e.g., with a polygon or pixel-wise annotations. A polygon or pixel-wise annotation may refer to a set of all pixels that represent an artifact. The training slides may include slides that contain one or more artifacts such as ink, hair, bubbles, or anything that refers to an artifact. These annotated digital pathology images may be received into digital storage (e.g., cloud storage, RAM, hard drive, etc.). These datasets may be created by manually segmenting sets of artifacts from digital pathology image and recording the polygon or pixel-wise annotations. In another embodiment, presaved pixels of annotations may be placed onto digital pathology images that do not contain artifacts with the exact location of the pixels saved.

Next, at step 304, the system may include extracting patches from segmented areas and areas without artifacts, and saving the extractions and/or segmented data into a memory. Extracting patches may include dividing the area of a digital image into, for example, M×M squares, where M is an integer, and extracting a patch from each area. The extracted patches may be various sizes and may depend on the digital pathology image. The particular patches may for example contains areas (e.g., pixels) with artifacts and areas without artifacts.

At step 306, the system may train the classification-based artifact detection system by applying a learning approach to the segmented data. Applying these learning approaches may include classical learning methods or deep models. For classical learning approaches, features (e.g., appearance-based or shape-based) may be extracted from images. Linear or non-linear approaches may be used to classify these features. Some of these approaches may include, for example, support vector machines (SVM), logistic regression, naïve base classification, Random Forest, boost classifier, etc. Further, deep models may be utilized to train the system. For deep models, convolutional neural networks (CNN) may be used to classify image tiles. For example, Resnet, Visual Geometry Group (VGG), squeezeNet, shuffleNet, etc. may be used. The learned system may be trained to output a score for each received patch or digital pathology image. The score may represent the likelihood that an artifact is present on a patch or digital pathology image.

FIG. 3B is a flowchart illustrating an example method for using an algorithm that uses a classification based approaches to identify artifacts in a digital pathology image, such as, for example, a WSI, according to techniques presented herein. The exemplary method 350 (e.g., steps 352-362) of FIG. 3B depicts steps that may be performed by, for example, by inference platform 135 of slide analysis tool 101. These steps may be performed automatically or in response to a request from a user (e.g., physician, patholo- gist, etc.). Alternatively, the method described in flowchart 350 may be performed by any computer process system capable of receiving image inputs such as device 1000 and capable of including or importing the neural network described in FIG. 3A.

FIG. 3B may depict using a classification based approaches to identify artifacts in a digital pathology image. Identifying an artifact may include using the trained machine learning model described in FIG. 3A to make inferences or determinations (i.e., "inference" or an "infer- ence process") with a classification-based artifact detection system.

First, at step 352, the system (e.g., the intake module 136) may receive one or more digital pathology images as input. The digital pathology images may be WSIs, which may refer to a digital image of a prepared microscopy slide. The digital images may also be magnetic resonance imaging (MRI) images, computed tomography (CT) images, positron emis- sion tomography (PET) images, or mammogram images. The digital pathology image may then be saved into elec- tronic storage (e.g., hard drive, network drive, cloud storage, RAM, etc.). The digital pathology image may or may not include artifacts.

At step 354, the system may first split the digital pathol- ogy images inputted at step 352 into patches. In some examples, the artifacts may only be removed from particular regions of the digital pathology images corresponding to non-background pixels of the whole slide images. For example, each digital pathology image may be comprised of a plurality of tiles, where the tiles include one or more of background pixels and non-background pixels. In one aspect, prior to identifying artifacts, the background pixels of the digital pathology images may be removed using. for example, Otsu's method (e.g., a type of automatic image thresholding that separates pixels into two classes, fore- ground and background) or by removing tiles, and thus the pixels comprising the tiles, with low variance from the digital pathology image. Accordingly, the non-background pixels of the digital pathology images remain for feature extraction. In another aspect, prior to identifying artifacts, the digital pathology images may be converted into a reduced summary form. The reduced summary form may include a collection of non-background RGB pixels of a digital pathology image or a set of neighboring non-back- ground pixel patches (or tiles) of a digital pathology image. Accordingly, the non-background pixels of the digital pathology images may remain for artifact identification. In some examples, for obtaining the reduced summary form, the digital pathology images may be split into a collection image tile or a set of distinct pixels.

At step 356, either the digital pathology image from step 352 or patches of non-background area from step 354 may be inputted into the trained learning module generated by the method described in FIG. 3A. In one embodiment, if a classical approach was used to train the system (e.g., scale- invariant feature transform or SIFT, second-order ultrasound field or SURF, etc.), then the patches of the non background area may be fed into the machine learning model from step 306. In another embodiment, if deep models were used to train the system at step 306, then the original input images from step 352 may be fed into the trained machine learning model from step 306.

At step 358, the system may use the machine learning system trained in FIG. 3A to assign a score to each patch received. The score may indicate whether an artifact is present (and/or whether an artifact is not present). The score may be an integer, rational number, percentage, category, or any other suitable form. In one embodiment, the score may represent a value between 0 and 1 where 0 represents that the system does not believe an artifact is present and 1 repre- sents the highest degree of certainty that an artifact is present.

At step 360, the scores may be thresholded to determine which patches have artifacts. At this step, the system may examine the score of all patches and determine whether each patch has a value above or below the threshold amount. The threshold amount may be a preselected or a user-inputted value. Additionally, the system may have a constant thresh- old value that is presaved. In one example, all patches with a score above the threshold value may be marked or recorded as including an artifact.

At step 362, a segmentation map of artifacts for each inputted digital pathology image may be created. In one example, the labels for each tile may be replaced with tile location to form a segmentation map of artifacts for a digital pathology image. The outputted map may be saved into electronic storage (e.g., hard drive, network drive, cloud storage, RAM, etc.). Additionally, the segmented map may be displayed to one or more users.

FIG. 4A is a flowchart illustrating an example method for training an algorithm that uses a segmentation based approach to identify artifacts in a digital pathology image, such as, for example, a WSI, according to techniques presented herein. The processes and techniques described in FIG. 4A may be used to train a machine learning model to identify artifacts or areas of interest of digital pathology images. The method 400 of FIG. 4A depicts steps that may be performed by, for example, training image platform 131 of slide analysis tool 101 as described above in FIG. 1C. Alternatively, the method may be performed by an external system. Flowchart/method 400 depicts training steps to train a machine learning model as described in further detail in steps 402-408.

Segmentation-based artifact detection may be used to delineate regions with artifacts by training a segmentation- based artifact detection system and making inferences with the segmentation-based artifact detection system.

At step 402, the system may create a dataset of artifacts on digital pathology images. The system may first receive one or more digital pathology image that may have no artifacts present. The digital pathology image may then have artifacts inserted for training purpose. This dataset may include digital pathology images with each artifact anno- tated, e.g., with a polygon or pixel-wise annotations. A polygon or pixel-wise annotation may refer to a set of all pixels that represent an artifact. The training digital pathol- ogy images may include digital pathology images that contain one or more artifacts such as ink, hair, bubbles, or anything that refers to an artifact. These annotated digital pathology images may be received into digital storage (e.g., cloud storage, RAM, hard drive, etc.). These datasets may be created by manually segmenting sets of artifacts from each digital pathology image and recording the polygon or pixel- wise annotations. In another embodiment, presaved pixels of annotations may be placed onto digital pathology images that do not contain artifacts with the exact location of the pixels saved.

At step 404, the system may extract tiles from each of the digital pathology image resulting from step 402. The tiles may be extracted from artifact regions and other non-artifact regions. The tiles may be extracted using the techniques described in step 304.

At step 406, the system may train a segmentation CNN model from the extracted tiles of step 404. For example, CNNs like Segnet, Unet, Deeplab, etc. may be utilized.

At step 408, the learned segmentation system may be saved to digital storage (e.g., cloud, hard drive, etc.).

FIG. 4B is a flowchart illustrating an example method for using an algorithm that uses segmentation based approaches to identify artifacts in a digital pathology image, according to techniques presented herein. The exemplary method 450 (e.g., steps 452-460) of FIG. 4 depicts steps that may be performed by, for example, by inference platform 135 of slide analysis tool 101. These steps may be performed automatically or in response to a request from a user (e.g., physician, pathologist, etc.). Alternatively, the method described in flowchart 450 may be performed by any computer process system capable of receiving image inputs such as device 1000 and capable of including or importing the neural network described in FIG. 4A.

At step 452, the system may receive one or more digital images as input. The digital image may be a digital pathology image, which may refer to, for example a digital image of a prepared microscopy slide. The digital pathology image may then be saved into electronic storage (e.g., hard drive, network drive, cloud storage, RAM, etc.). The digital pathology image may or may not include artifacts. Additionally, the system may be configures to receive tiles of digital images in addition to full digital pathology images.

At step 454, the system may divide one or more inputted digital pathology images into small image patches. The system may use the techniques described in step 354 to create smaller image patches/tiles.

At step 456, the system may feed the image patches from step 454 to the segmentation model (e.g., the model trained at step 406).

At step 458, the system may include segmenting the artifact region on each tile. This may include identifying and saving the pixel information for the segmented and non-segmented regions of each tile. The trained segmentation model may perform this action.

At step 460, the system may include combining the segmented patches to construct a segmentation map for the digital pathology images. This may include outputting a map that include pixel information with the location of all identified artifacts. These areas may correspond to pixels/areas with a score above a threshold value. The outputted map may be saved into electronic storage (e.g., hard drive, network drive, cloud storage, RAM, etc.). Additionally, the segmented map may be displayed to one or more users.

As described earlier, artifact-specific approaches may also be applied to detect areas of interest, such as at step 204 of the method depicted in FIG. 2. Artifact-specific approaches may be applied on a low power field (e.g., low magnification factor) and might not involve a patch extraction step. For example, if an artifact is of a relatively larger size (e.g., a digital slide that has bubbles) and is visible at a relatively low resolution zoomed-out perspective of the digital medical image, the system may be capable of detecting artifacts without the patch extraction step. Artifact-specific approaches may be much quicker than learning approaches but may be less accurate than learning approaches. Artifact-specific approaches may include approaches based on appearance and approaches based on shape.

With artifact-specific methods based on appearance, a second review or assessment may be used where a marking or artifact might block some regions or where a visualizing experience for a slide is otherwise compromised. The second review may be performed by a human or another alternative machine learning system. Other artifacts in the image may include hair, blurred regions, bubbles, tissue folding, and burnt tissue. Artifacts may be detected based on their color information and intensities by applying classical image analysis methods on image tiles. This may include investigating a handful of images with an artifact of interest, recording the red-green-blue (RGB) ranges (color spectrum) of regions with the artifact, and removing regions with the identified color spectrum. This may include applying threshold (e.g., Otsu threshold) on the image after converting it to grayscale or applying threshold (e.g., Otsu threshold) on a hue or saturation channels on color space.

With artifact-specific methods based on shape, some artifacts may be removed based on their shape. For example, bubbles typically have round, circular, or spherical shapes, hairs may have an elongated or clearing shape, or other artifacts may be detected by detecting interferences or destructions to typical shapes of surrounding structures, such as by missing areas around a cluster of nuclei on an image which would otherwise have a curved shape. Some approaches to remove these artifacts include using a circle Hough Transform (CHT) to detect circles or using a Frangi filter for line and tube detection.

For out of focus (blurred) regions, a digital pathology image may be divided into patches. A blur detection algorithm may be applied to these patches or tiles. The blur detection algorithms may include training a deep model to identify a blur region and/or using gradient or Laplacian based approaches. A trained blue detection algorithm may include training a neural network to take as input a region (e.g., a patch) and determine a blur score. The blur score may be a binary classifier that indicates whether an image is blurry or not blurry. If a Laplacian method is used to train the blur detection system, the system may provide linear filtering of an image patch with a Laplacian operator. Next, the system may compute the variance of the filter response within the patches. The system may threshold the resulting values to determine whether blur is present. With respect to the outputted blur values, a lower blur value may correspond to a "less blurry" image.

Systems and methods disclosed herein may detect arbitrary structures.

Detecting structures of interest may be a part of step 204. For example, digital pathology images may contain many structures and objects, e.g. glands, vessels, fat, etc. Sometimes, visualizing only one type of structure or object may be useful. Such visualization may not only help for further quantification but also may help to determine how particular objects are spread in the tissue microenvironment. For example, observing malignant epithelial and lymphocyte cells may be useful to understand how an immune system is responding to cancer. Many other cells may cause a visual error. These visual errors may be adjusted or removed by using digital images and applying segmentation techniques on the images.

Detecting a structure of interest may include training a system and inferring with the trained system as further disclosed in FIGS. 5A and 5B.

FIG. 5A is a flowchart illustrating an example method for training a system to identify structures of interest in a digital pathology image, according to techniques presented herein. The processes and techniques described in FIG. 5A may be used to train a machine learning model to identify artifacts or areas of interest of digital pathology images. The method

500 of FIG. 5A depicts steps that may be performed by, for example, training image platform 131 of slide analysis tool 101 as described above in FIG. 1C. Alternatively, the method may be performed by an external system. Flowchart/method 500 depicts training steps to train a machine learning model as described in further detail in steps 502-506.

At step 502, a segmentation dataset may be created by manual segmentation images that have been inserted into the system for training. The segmentation dataset may include digital pathology images with structures of interest segmented with the pixel location recorded. These may have been created using the techniques described in steps 302 and 402.

At step 504, the system may receive the segmentation dataset and then may extract patches from each digital pathology image with their corresponding segmentation image. The system may utilize the extraction techniques described in step 304.

At step 506, the system may train a deep neural network for segmentation on the image patches and their corresponding labels. The segmentation network may be, for example, Segnet, Unet, Deeplab, MaskRCNN, etc. The learned system may then be saved to one or more storage devices 109 or uploaded to another digital storage system through network 120.

FIG. 5B is a flowchart illustrating an example method for using a system to identify structures of interest in a digital pathology image, according to techniques presented herein. The exemplary method 550 (e.g., steps 552-556) of FIG. 5B depicts steps that may be performed by, for example, by inference platform 135 of slide analysis tool 101. These steps may be performed automatically or in response to a request from a user (e.g., physician, pathologist, etc.). Alternatively, the method described in flowchart 550 may be performed by any computer system capable of receiving image inputs such as device 1000 and capable of including or importing the neural network described in FIG. 5A.

At step 552, the system may first receive one or more digital pathology image and then split the received digital pathology image of interest to small patches. Any of the techniques discussed herein may be utilized to split the digital pathology image into smaller patches.

Next at step 554, the system may segment the patches using a deep neural network described in step 506. The segmented patches may be recorded and saved to digital storage.

Last, at step 556, the system may merge the segmented region to create a segmentation map on a digital pathology image level and output and/or save the segmentation for each digital pathology image. The system may be capable of performing image compositing to merge the segmented regions. This may include pasting one source image (e.g., a patch of a segmented region) into another target image. This may be performed by replacing the pixels of the target image with the pixels of the source image. If pixels are in both images (e.g., a patch overlaps with the segmented region and the original), the system may either only use the segmented pixel or use a mix of both (e.g., 50% of both pixels may be utilized). Additionally, the system may be capable of using alternative techniques such as lap-pyramid, DIM, index, and/or deep learning methods to merge the segmented regions.

As previously mentioned at step 206, the system may inpaint or suppress one or more irrelevant regions of an image.

Using systems and methods disclosed herein, a user (e.g., pathologist) may use inpainting to remove artifacts. This may be performed by the inference module 137 of FIG. 1C. After detecting regions with artifacts at step 204 of the method discussed above with respect to FIG. 2A, the user may select an option to restore those regions or areas. Various inpainting algorithms may be used to fill those areas with a meaningful structure. Users may manually select void areas, or those areas may be selected automatically based on an artifact-detected region from 204 (or alternatively, a non-artifact detected region). If a user manually selects the area, a user may type coordinate/pixels and or highlight the area of a digital pathology image using a computer interface to interact with the system. The selected regions may be used as an input to the inpainting algorithm. Some conducive inpainting algorithms that the system may apply include local patch statistics and/or steering kernel feature; intra-channel and/or inter-channel local variances; fractional-order derivative, fourier transform fractional-order derivative, and/or fourier transform; encoder-decoder architectures like Unet; and generative adversarial networks (GANs). The system may automatically apply one of the inpainting algorithms or alternatively, may allow for a user (e.g., a pathologist) to select which inpainting algorithm to utilize.

Using systems and methods disclosed herein, a user (e.g., pathologist) may use suppression of irrelevant image regions to highlight arbitrary cellular structures. This may be performed by the inference module 137 of FIG. 1C. To highlight tissues of interest and suppressing other aspects of a digital pathology image, systems and methods disclosed herein may first detect regions of interest (e.g., specific glands), and then set a transparency value, such as, for example, an alpha value or an alpha channel, for all other tissues and regions on the digital pathology image to an alternative level. For example, the transparency value may be set to make those other tissues and regions invisible or to make them partially transparent to hide them from view.

Figure 6:
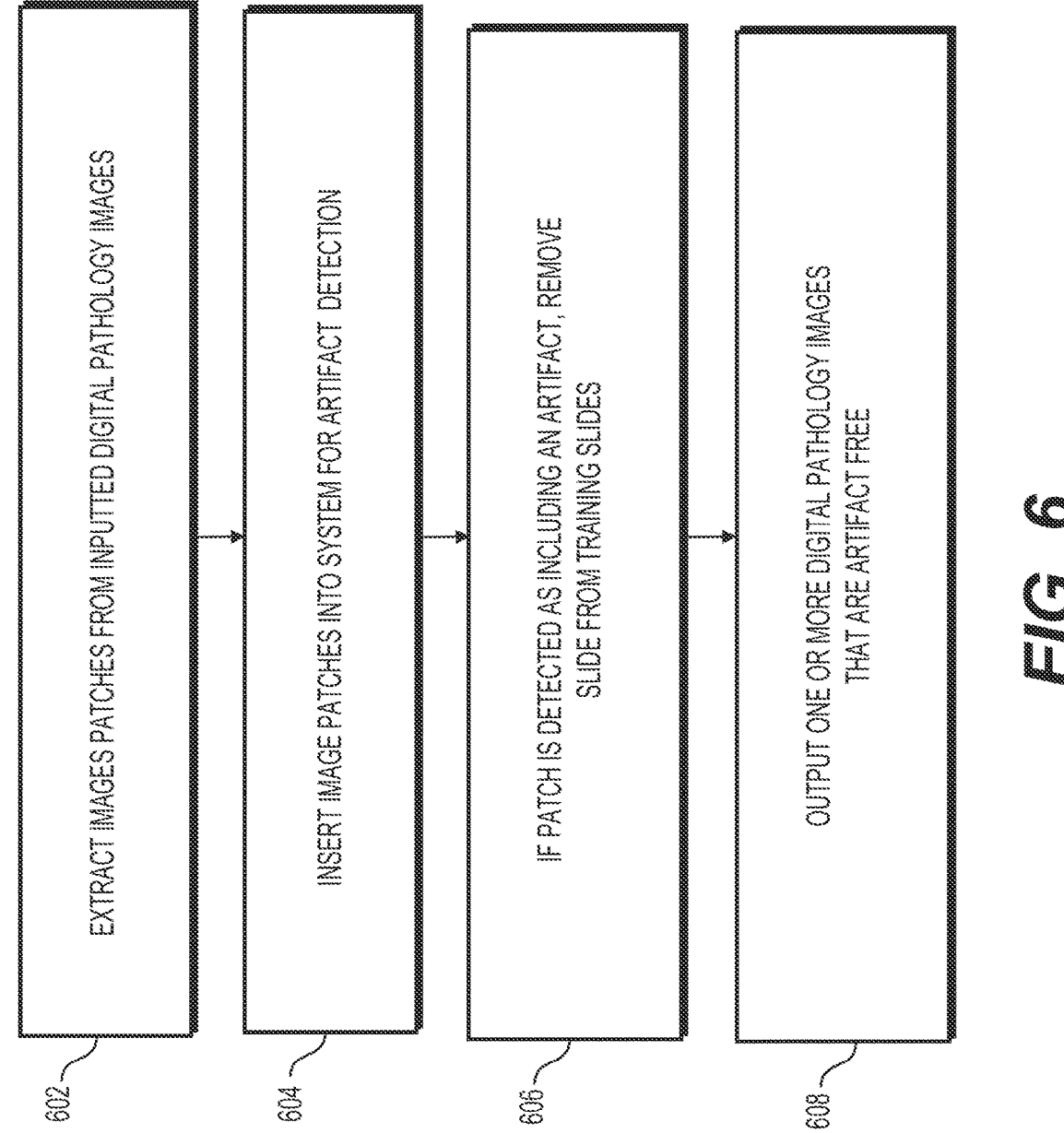
FIG. 6 is a flowchart illustrating an example embodiment of the system for selecting artifact removal for training.

FIG. 6 is a flowchart illustrating an example embodiment of the system for selecting artifact removal for training. This may be an exemplary embodiment of the process 200 described in FIG. 2. Systems and methods disclosed herein may selectively remove artifacts from digital pathology images. For model development and training deep models, a presence of artifacts in digital pathology images may decrease a signal to noise ratio (SNR) and may lead to a performance drop. Because of this, it may be advantageous to remove artifacts from digital pathology images prior to using the digital pathology images for training a machine learning system.

Systems and methods disclosed herein may help to remove one or more unwanted artifacts from a digital pathology image to provide a clean and noise free data set for training deep neural networks or other learning approaches. First, at step 602 the system may receive one or more digital pathology image. At step 602, image patches may be extracted from digital pathology images using any of the techniques discussed herein. Next, at step 604 the image patches may be passed into the artifact detection module (e.g., any of the systems that implement step 204). At this step, any of the techniques/approaches discussed herein may be used to detect and record the location of any artifacts sent.

At step 606, if a patch within a digital pathology image is detected as having an artifact present, the patch may be removed by the system and not used for further training. If the patch is detected as not having an artifact, the patch may be used for training a machine learning system. Optionally, for the patches where an artifact is detected, the artifact may be suppressed/inpainted using any of the techniques described herein (e.g., any of the systems that implement step 206). If the artifact is suppressed and/or inpainted, it may then be used for training. Finally, at step 608, the slides may be outputted as one or more datasets that may be free of artifacts. The slides may be outputted to storage device 109 or to the network 120. These digital pathology images may then be sent to train one or more machine learning systems.

Figure 7:
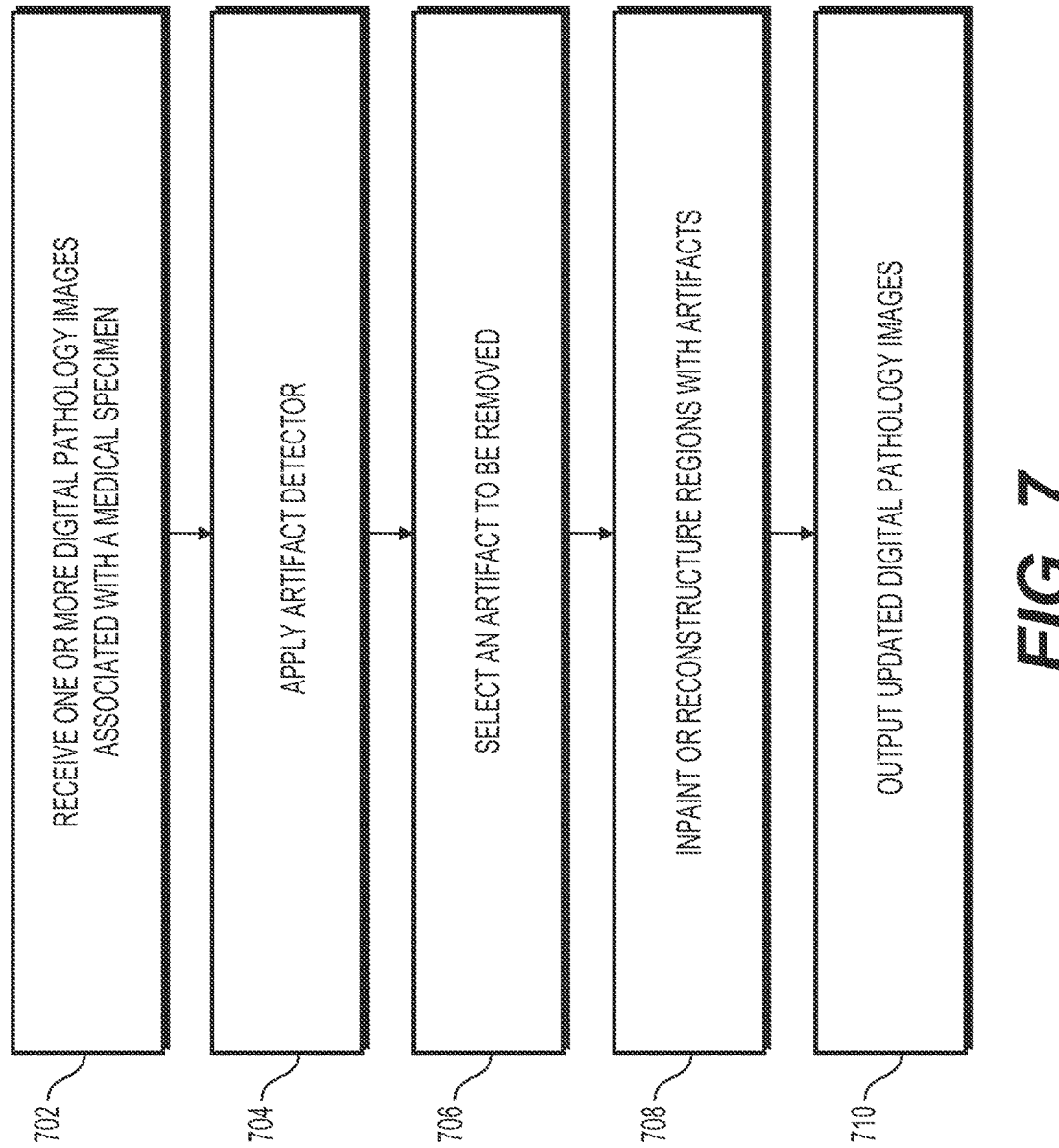
FIG. 7 is a flowchart illustrating an example embodiment of the system for selecting artifact removal for visualization.

FIG. 7 is a flowchart illustrating an example embodiment of the system for selecting artifact removal from digital pathology images for visualization. This may be an exemplary embodiment of the process 200 described in FIG. 2. In a digital pathology image viewer, a user (e.g., pathologist) may use systems and methods disclosed herein to select artifacts for removal from a digital pathology image, and an artifact removal system may be applied on the digital pathology image (e.g., using any of the techniques discussed for step 206).

For example, at step 702, the system may receive one or more digital pathology images (e.g., WSIs). Next, at step 704 the system may identify artifacts in the digital pathology images using any of the techniques discussed at step 204. In one example, the system may use a preset technique to identify artifacts. In another example, the user may have the option to choose which technique to utilize to search for artifacts on the digital pathology images. For example, for pen marking and burnt tissue, which are common artifacts, artifact-specific approaches may be applied, which may be much faster than artifact-agnostic approaches At step 706, after an artifact detector has been applied, a list of artifact names may be shown in a graphical user interface, and the user may choose an artifact among the artifacts provided in the list. Further, the user may be able to select an area/region of a digital pathology image wherein all artifacts in the region of the digital pathology image may be selected. The chosen artifact may then be inpainted or suppressed at step 708.

At step 708, the system may inpaint or reconstructed regions of the digital pathology image with artifacts that may have been selected by the user. The system may utilize any of the techniques discussed related to step 206 to perform this step. The user may choose if they want a detected area to be filled with one or more meaningful structures (e.g., a background, a special color, or tissue). For example, the user may choose such a structure from a provided checkbox. If this option is enabled, then an inpainting algorithm may be applied on these regions, and the image may be reconstructed. At step 710, the digital pathology images with artifacts inpainted or suppressed may be outputted to storage device 109 or to the network 120.

Figure 8:
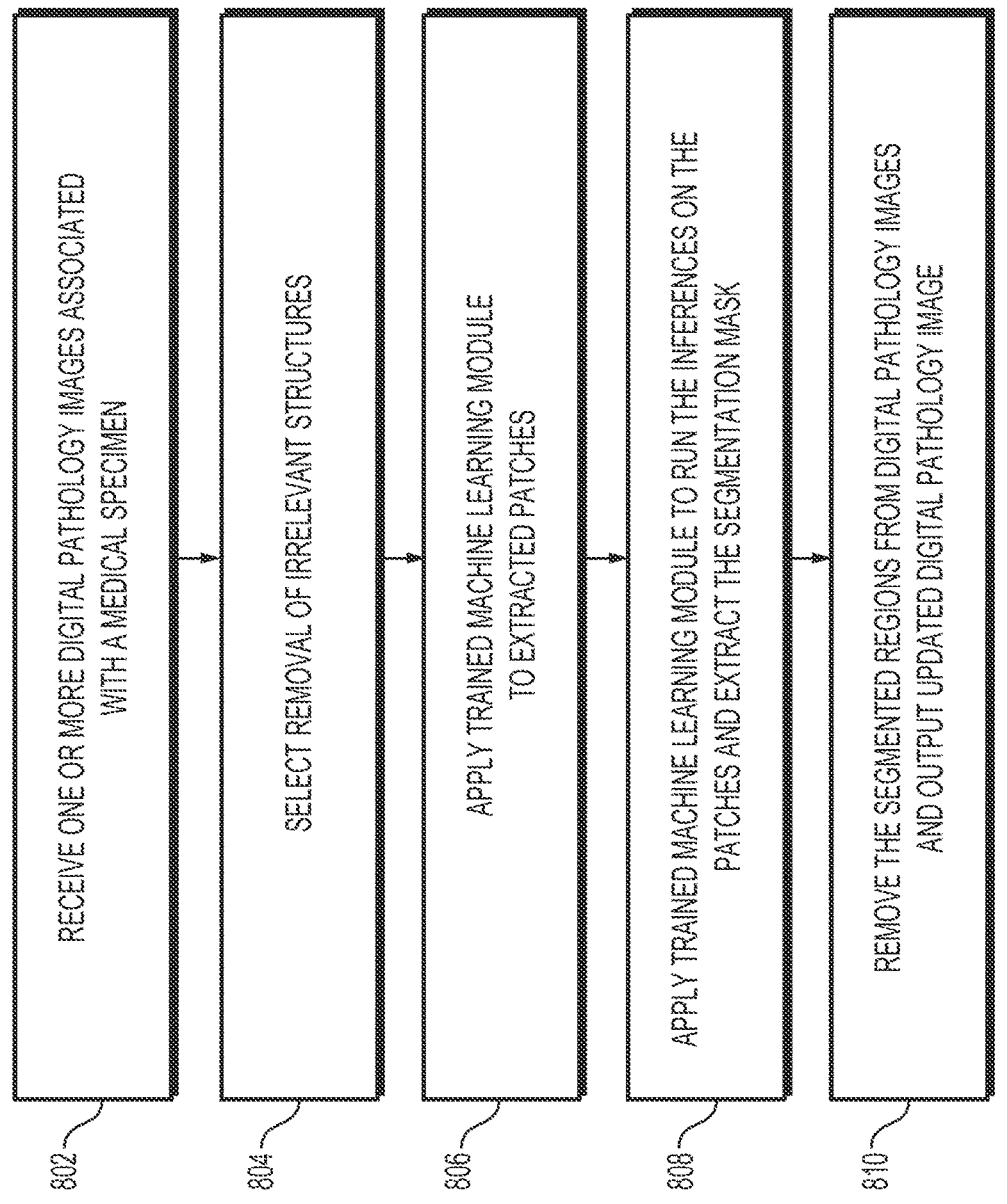
FIG. 8 is a flowchart illustrating an example embodiment of the system for selecting removal of irrelevant structures for visualization.

FIG. 8 is a flowchart illustrating an example embodiment of the system for selecting removal of irrelevant structures from digital pathology images for visualization. This may be an exemplary embodiment of the process 200 described in FIG. 2. Selectively hiding and showing certain structures in a viewer (e.g., a digital pathology image viewer) may provide a better visualization experience and a better understanding of frequency/spatial distribution of certain objects. At step 802, the system may receive one or more digital pathology images associated with a medical specimen. At step 804, using systems and methods disclosed herein, users may select to hide and show irrelevant structures using any of the techniques discussed herein (e.g., the techniques discussed related to step 204 may find these structures). Alternatively, a user may select areas of a digital pathology image of interest, and the rest of the areas may be considered irrelevant structures. In one embodiment, the irrelevant structure may be the background and, for example, only nuclei in the digital pathology images may be left. The user may select to keep unhidden or visualize certain nuclei such as tumor nuclei. At step 806, when a structure of interest/or an irrelevant structure is selected, systems and techniques discussed herein may be applied to a digital pathology image to extract patches. At step 808, the system may use any techniques described herein (e.g., techniques associated with step 206) on the patches to extract a segmentation mask (e.g., an area of irrelevant structures). At step 810, the segmented regions (e.g., irrelevant structures) may be removed from the digital pathology image using any of the techniques discussed related to step 206.

Systems and methods disclosed herein may identify artifacts and use inpainting to remove the artifacts from digital pathology images. Systems and methods disclosed herein may identify cellular structures within digital pathology images and show and/or highlighting those structures without extraneous tissue or artifacts in digital pathology imagery.

FIG. 9 is a flowchart illustrating methods for how to process a digital pathology image (e.g., detect artifacts and or areas of interest and apply image painting or suppressions), according to one or more exemplary embodiments herein. Flowchart 900 may depict steps to utilize a trained machine learning module as describe in further detail in steps 902-910.

At step 902, the system (e.g. the intake module 136) may receive a plurality of digital pathology images of at least one pathology specimen, the pathology specimen being associated with a patient.

At step 904, the system (e.g., the inference module 137) may determine, using a machine learning system, whether artifacts or objects of interest are present on the digital pathology images.

At step 906, the system (e.g., the inference module 137) may, upon determining that an artifact or object of interest is present, determine one or more regions on the digital pathology images that contain artifact or objects of interest.

At step 908, the system, (e.g., the inference module 137) upon determining the regions on the digital pathology image that contain artifacts or objects of interest, using a machine learning system to inpaint or suppress the region.

At step 910, the system (e.g., the output interface 138) may output the digital pathology images with the artifacts or objects of interest inpainted or suppressed.

Figure 10:
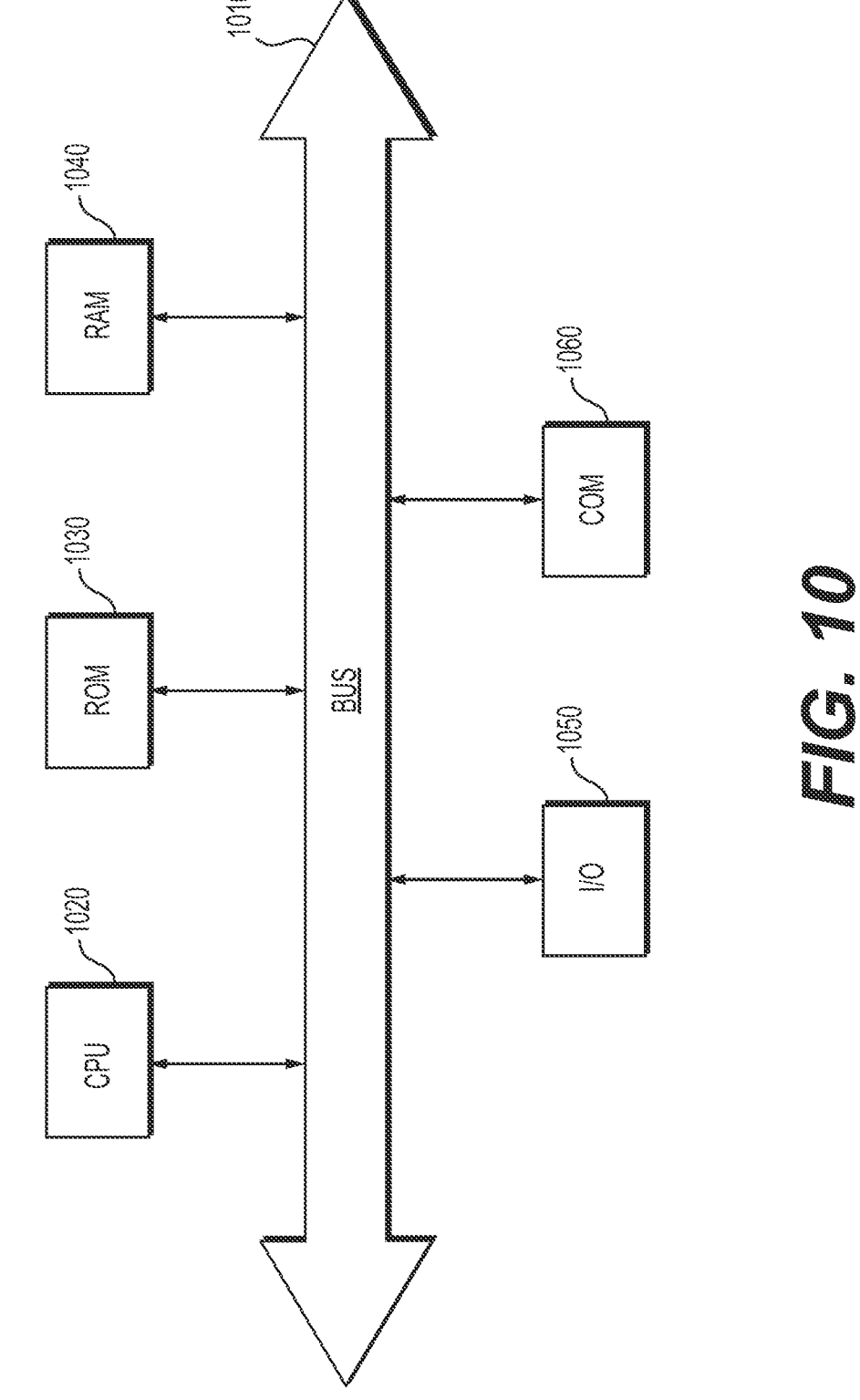
FIG. 10 depicts an example of a computing device that may execute techniques presented herein, according to one or more embodiments.

FIG. 10 depicts an example of a computing device that may execute techniques presented herein, according to one or more embodiments.

As shown in FIG. 10, device 1000 may include a central processing unit (CPU) 1020. CPU 1020 may be any type of processor device including, for example, any type of special purpose or a general-purpose microprocessor device. As will be appreciated by persons skilled in the relevant art, CPU 1020 also may be a single processor in a multi-core/multi-processor system, such system operating alone, or in a cluster of computing devices operating in a cluster or server farm. CPU 1020 may be connected to a data communication infrastructure 1010, for example a bus, message queue, network, or multi-core message-passing scheme.

Device 1000 may also include a main memory 1040, for example, random access memory (RAM), and also may include a secondary memory 1030. Secondary memory 1030, for example a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1030 may include similar means for allowing computer programs or other instructions to be loaded into device 1000. Examples of such means may include a program cartridge and cartridge interface (such as that found in video game devices), a removable memory chip (such as an EPROM or PROM) and associated socket, and other removable storage units and interfaces, which allow software and data to be transferred from a removable storage unit to device 1000.

Device 1000 also may include a communications interface ("COM") 1060. Communications interface 1060 allows software and data to be transferred between device 1000 and external devices. Communications interface 1060 may include a modem, a network interface (such as an Ethernet card), a communications port, a PCMCIA slot and card, or the like. Software and data transferred via communications interface 1060 may be in the form of signals, which may be electronic, electromagnetic, optical or other signals capable of being received by communications interface 1060. These signals may be provided to communications interface 1060 via a communications path of device 1000, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Device 1000 may also include input and output ports 1050 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Throughout this disclosure, references to components or modules generally refer to items that logically can be grouped together to perform a function or group of related functions. Like reference numerals are generally intended to refer to the same or similar components. Components and modules may be implemented in software, hardware or a combination of software and hardware.

The tools, modules, and functions described above may be performed by one or more processors. "Storage" type media may include any or all of the tangible memory of the computers, processors, or the like, or associated modules thereof, such as various semiconductor memories, tape drives, disk drives and the like, which may provide non-transitory storage at any time for software programming.

Software may be communicated through the Internet, a cloud service provider, or other telecommunication networks. For example, communications may enable loading software from one computer or processor into another. As used herein, unless restricted to non-transitory, tangible "storage" media, terms such as computer or machine "readable medium" refer to any medium that participates in providing instructions to a processor for execution.

The foregoing general description is exemplary and explanatory only, and not restrictive of the disclosure. Other embodiments of the invention will be apparent to those skilled in the art from consideration of the specification and practice of the invention disclosed herein. It is intended that the specification and examples to be considered as exemplary only.

What is claimed is:

1. A computer-implemented method for processing digital pathology images, comprising:

receiving a plurality of digital pathology images of at least one pathology specimen, the pathology specimen being associated with a patient;

determining, using a first machine learning system, whether artifacts are present on the digital pathology images, the first machine learning system using artifact-agnostic learning techniques;

upon determining that an artifact is present, determining one or more regions on the digital pathology images that contain artifacts;

upon determining the one or more regions on the digital pathology images that contain artifacts, using a second machine learning system to inpaint or suppress the one or more regions; and outputting the digital pathology images with the artifacts inpainted or suppressed.

2. The method of claim 1, wherein the artifact-agnostic learning techniques include applying classification-based learning techniques.

3. The method of claim 2, wherein applying the classification-based learning techniques to determine whether artifacts are presents further includes:

assigning a score to each patch within the plurality of digital pathology images; and determining that the assigned scores are above a threshold value to classify a respective patch as including artifacts.

4. The method of claim 1, wherein the artifact-agnostic learning techniques include applying segmentation-based learning techniques.

5. The computer-implemented method of claim 1, wherein the artifacts includes writing utensil marking, hair, blur, scanlines, and/or bubbles displayed on the plurality of digital pathology images.

6. The method of claim 1, further comprising:

determining a segmentation map of the one or more regions on the digital pathology images that contain artifacts.

7. A system for processing electronic medical images, the system comprising:

at least one memory storing instructions; and at least one processor configured to execute the instructions to perform operations comprising:

receiving a plurality of digital pathology images of at least one pathology specimen, the pathology specimen being associated with a patient;

determining, using a first machine learning system, whether artifacts are present on the digital pathology images, the first machine learning system using artifact-agnostic learning techniques;

upon determining that an artifact is present, determining one or more regions on the digital pathology images that contain artifacts;

upon determining the one or more regions on the digital pathology images that contain artifacts, using a second machine learning system to inpaint or suppress the one or more regions; and outputting the digital pathology images with the artifacts inpatined or suppressed.

8. The system of claim 7, wherein the artifact-agnostic learning techniques include applying classification-based learning techniques.

9. The system of claim 8, wherein applying the classification-based learning techniques to determine whether artifacts are presents further includes:

assigning a score to each patch within the plurality of digital pathology images; and determining that the assigned scores are above a threshold value to classify a respective patch as including artifacts.

10. The system of claim 7, wherein the artifact-agnostic learning techniques include applying segmentation-based learning techniques.

11. The system of claim 7, wherein the artifacts includes writing utensil marking, hair, blur, scanlines, and/or bubbles displayed on the plurality of digital pathology images.

12. The system of claim 7, further comprising:

determining a segmentation map of the one or more regions on the digital pathology images that contain artifacts.

13. A system for processing electronic medical images, the system comprising at least one memory storing instructions; and at least one processor configured to execute the instructions to perform operations comprising:

receiving a plurality of digital pathology images of at least one pathology specimen, the pathology specimen being associated with a patient;

determining, using a first machine learning system, whether artifacts are present on the digital pathology images, the first machine learning system using artifact-specific learning techniques;

receiving, from one or more users, a first artifact type to search for and remove;

upon determining that the first artifact type is present, determining one or more regions on the digital pathology images that contain the first artifact type;

upon determining the one or more regions on the digital pathology images that contain the first artifact type, using a second machine learning system to inpaint or suppress the one or more regions; and outputting the digital pathology images with the first artifact type inpatined or suppressed.

14. The system of claim 13, wherein the artifacts includes writing utensil marking, hair, blur, scanlines, and/or bubbles displayed on the plurality of digital pathology images.

15. The system of claim 13, wherein the first machine learning system using the artifact-specific learning techniques applies learning techniques based on a shape of one or more artifacts.

16. The system of claim 13, wherein the first machine learning system using the artifact-specific learning techniques applies learning techniques based on an appearance of one or more artifacts.

17. The system of claim 13, wherein the first artifact type is blur.

* * * * *